US009862090B2

(12) United States Patent
Kennedy et al.

(10) Patent No.: US 9,862,090 B2
(45) Date of Patent: Jan. 9, 2018

(54) SURROGATE: A BODY-DEXTEROUS MOBILE MANIPULATION ROBOT WITH A TRACKED BASE

(71) Applicant: California Institute of Technology, Pasadena, CA (US)

(72) Inventors: Brett A. Kennedy, Pasadena, CA (US); Paul Hebert, Pasadena, CA (US); Jeremy C. Ma, Pasadena, CA (US); James W. Borders, Pasadena, CA (US); Charles F. Bergh, Thousand Oaks, CA (US); Nicolas H. Hudson, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 127 days.

(21) Appl. No.: 14/810,349

(22) Filed: Jul. 27, 2015

(65) Prior Publication Data

US 2016/0023352 A1 Jan. 28, 2016

Related U.S. Application Data

(60) Provisional application No. 62/029,017, filed on Jul. 25, 2014.

(51) Int. Cl.
*G05B 15/00* (2006.01)
*G05B 19/00* (2006.01)
(Continued)

(52) U.S. Cl.
CPC ............ *B25J 9/06* (2013.01); *B25J 5/005* (2013.01); *B25J 9/0087* (2013.01);
(Continued)

(58) Field of Classification Search
CPC ... B25J 9/06; B25J 9/0087; B25J 5/005; B25J 15/0009; B25J 19/21; B25J 17/00;
(Continued)

(56) References Cited

U.S. PATENT DOCUMENTS

| 7,348,747 B1* | 3/2008 | Theobold ................. B25J 5/005 |
| | | 318/568.11 |
| 2005/0125100 A1* | 6/2005 | Stoddard ................ B25J 9/1607 |
| | | 700/245 |

(Continued)

OTHER PUBLICATIONS

Wimbock, Experimental Study on Dynamic Reactionless Motions with DLR's Humanoid Robot Justin, Oct. 2009, IEEE.*

(Continued)

*Primary Examiner* — Rachid Bendidi
(74) *Attorney, Agent, or Firm* — KPPB LLP

(57) ABSTRACT

Robotics platforms in accordance with various embodiments of the invention can be utilized to implement highly dexterous robots capable of whole body motion. Robotics platforms in accordance with one embodiment of the invention include: a memory containing a whole body motion application; a spine, where the spine has seven degrees of freedom and comprises a spine actuator and three spine elbow joints that each include two spine joint actuators; at least one limb, where the at least one limb comprises a limb actuator and three limb elbow joints that each include two limb joint actuators; a tracked base; a connecting structure that connects the at least one limb to the spine; a second connecting structure that connects the spine to the tracked base; wherein the processor is configured by the whole body motion application to move the at least one limb and the spine to perform whole body motion.

11 Claims, 16 Drawing Sheets

(51) Int. Cl.
- *B25J 9/06* (2006.01)
- *B25J 5/00* (2006.01)
- *B25J 9/00* (2006.01)
- *B25J 15/00* (2006.01)
- *B25J 19/02* (2006.01)

(52) U.S. Cl.
CPC ......... *B25J 15/0009* (2013.01); *B25J 19/021* (2013.01); *Y10S 901/09* (2013.01); *Y10S 901/28* (2013.01); *Y10S 901/30* (2013.01); *Y10S 901/47* (2013.01)

(58) Field of Classification Search
CPC ....... B25J 19/02; Y10S 901/01; Y10S 901/28; Y10S 901/30; Y10S 901/47
See application file for complete search history.

(56) References Cited

U.S. PATENT DOCUMENTS

| | | | |
|---|---|---|---|
| 2008/0179115 A1* | 7/2008 | Ohm | B25J 5/005 180/9.21 |
| 2009/0314554 A1* | 12/2009 | Couture | B25J 5/005 180/8.7 |
| 2010/0263948 A1* | 10/2010 | Couture | B25J 5/005 180/8.2 |
| 2013/0105233 A1* | 5/2013 | Couture | B25J 5/005 180/9.1 |
| 2013/0340560 A1* | 12/2013 | Burridge | B25J 17/00 74/490.05 |
| 2016/0008988 A1 | 1/2016 | Kennedy | |

OTHER PUBLICATIONS

"Bear Robot," Vecna Technologies, Inc., Dec. 9, 2013, Retrieved from https://web.archive.org/web/20140131193946/http://www.vecna.com/research, on Jul. 8, 2014, 9 pages.

"Dual Arm", HDT Global, 2015, Retrieved from http://www.hdtglobal.com/product/dual-arm/ on Jul. 8, 2014, 7 pages.

Backes, "Dual-arm supervisory and shared control task description and execution", Robotics and Autonomous Systems, vol. 12, Issues 1-2, Mar. 1994, pp. 29-54.

Bajracharya et al., "Real-time 3d stereo mapping in complex dynamic environments", In International Conference on Robotics and Automation—Semantic Mapping, Perception, and Exploration (SPME) Workshop, 2012, Shanghai, China, 8 pages.

Gennery, Donald B. et al., "Generalized Camera Calibration Including Fish-Eye Lenses", International Journal of Computer Vision, vol. 68, Issue 3, Jul. 2006, pp. 239-266.

Hudson, Nicolas et al., "Model-based autonomous system for performing dexterous, human-level manipulation tasks", Autonomous Robots, vol. 36 (1-2), Feb. 10, 2014, ISSN 0929-5593, pp. 31-49.

Hudson et al., "End-to-end dexterous manipulation with deliberate interactive estimation", 2012 IEEE International Conference on Robotics and Automation, May 14-18, 2012, Saint Paul, MN, USA, pp. 2371-2378.

Ju et al., "Dual contouring of hermite data", ACM Transactions on Graphics, vol. 21, Issue 3, Jul. 2002, pp. 339-346.

Kalakrishnan et al., Learning objective functions for manipulation, 2013 IEEE International Conference on Robotics and Automation, May 6-10, 2013, Karlsruhe, Germany, pp. 1331-1336.

Kuffner et al., "RRT-connect: An efficient approach to single-query path planning", Proceedings 2000 ICRA. Millennium Conference. IEEE International Conference on Robotics and Automation. Symposia Proceedings (Cat. No. 00CH37065), vol. 2, Apr. 24-28, 2000, San Francisco, CA, USA, pp. 995-1001.

Leidner et al., "Object-Centered Hybrid Reasoning for Whole-Body Mobile Manipulation", 2014 IEEE International Conference on Robotics and Automation (ICRA), May 31-Jun. 7, 2014, Hong Kong, China, pp. 1828-1835.

Lorensen et al., "Marching cubes: A high resolution 3D surface construction algorithm", ACM SIGGRAPH Computer Graphics, vol. 21, Issue 4, Jul. 1987, pp. 163-169.

Pastor et al., "Skill learning and task outcome prediction for manipulation", 2011 IEEE International Conference on Robotics and Automation, May 9-13, 2011, Shanghai, China, pp. 3828-3834.

Poston et al., "Multiresolution Isosurface Extraction with Adaptive Skeleton Climbing", Computer Graphics Forum, vol. 17, Issue 3, Sep. 1998, pp. 137-147.

Zhang et al., "A Unified Quadratic-Programming-Based Dynamical System Approach to Joint Torque Optimization of Physically Constrained Redundant Manipulators", IEEE Transactions on Systems, Man, and Cybernetics—Part B: Cybernetics, vol. 34, No. 5, Oct. 2004, pp. 2126-2132.

* cited by examiner

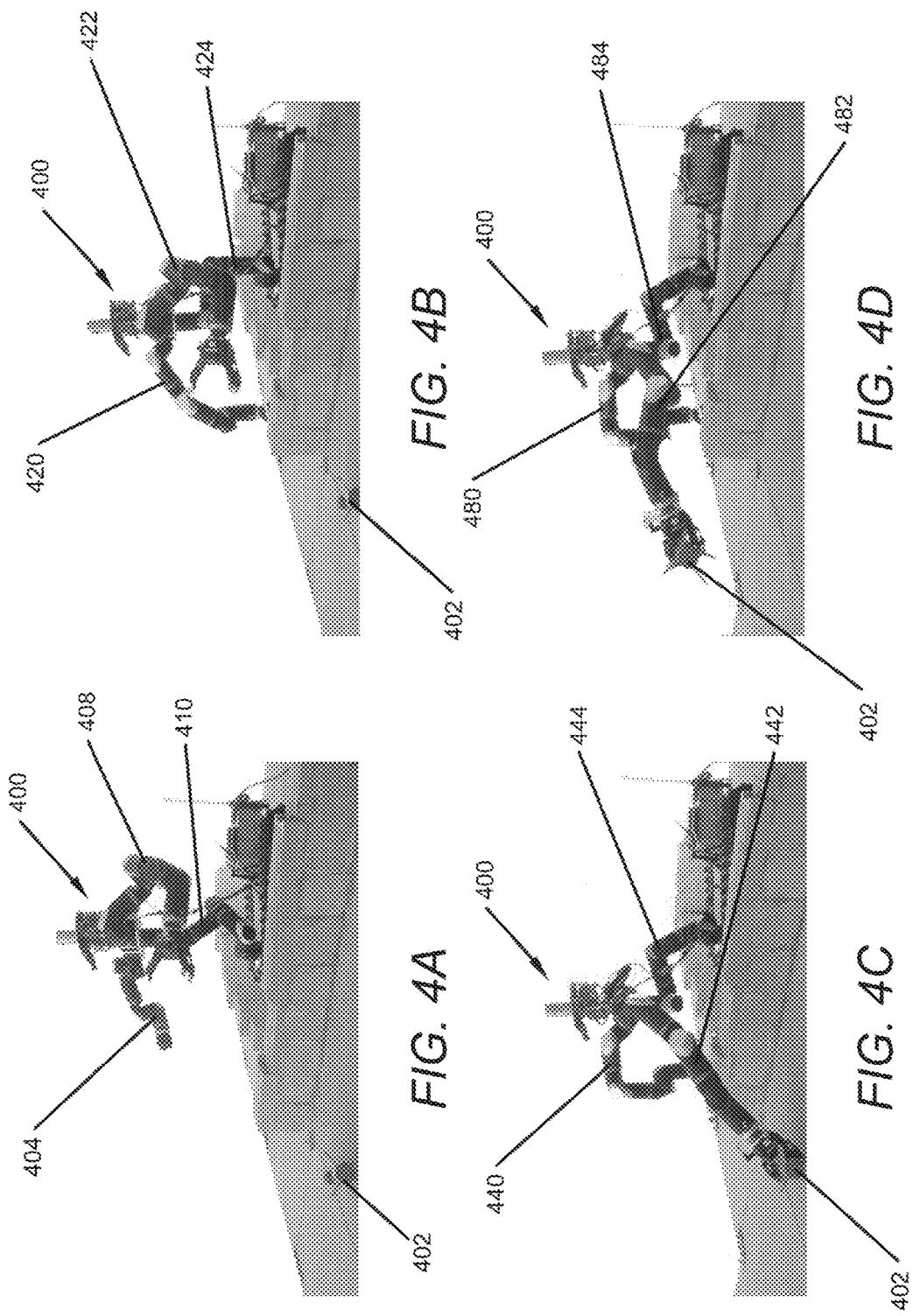

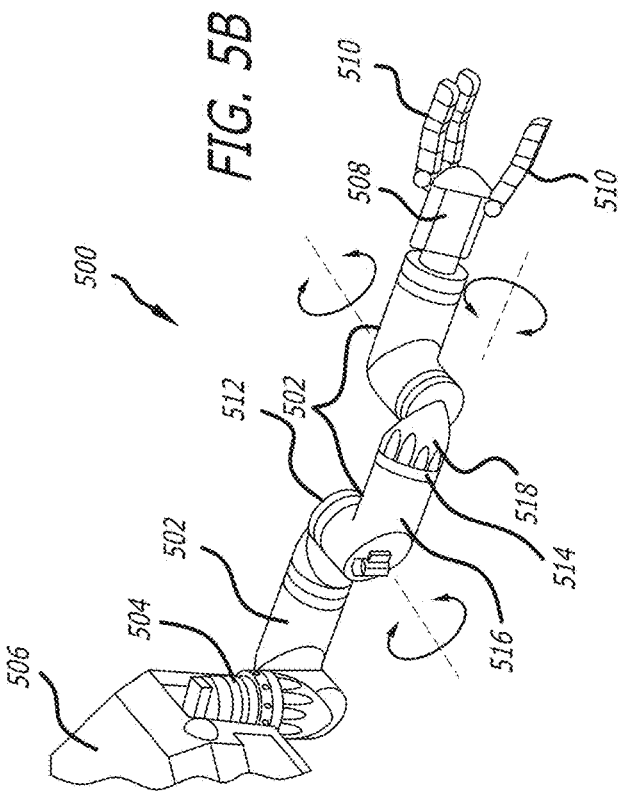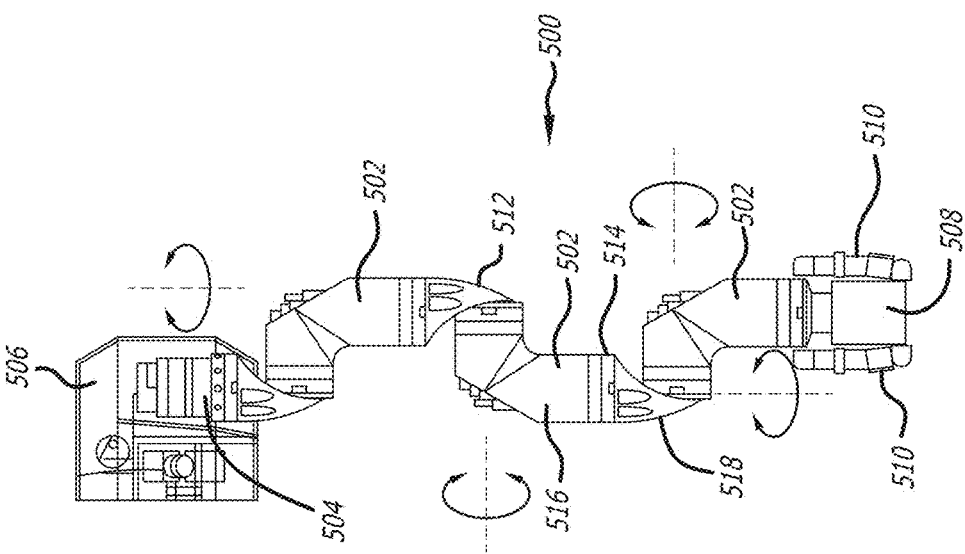

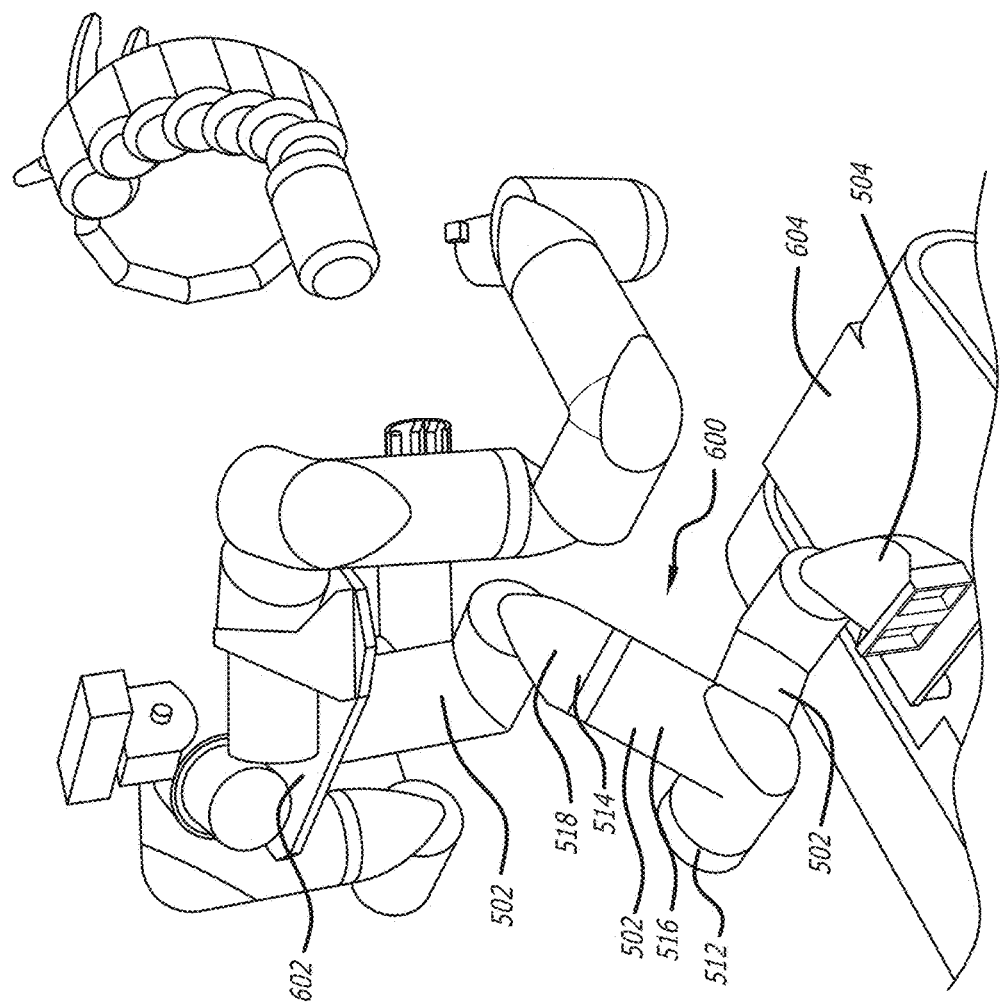

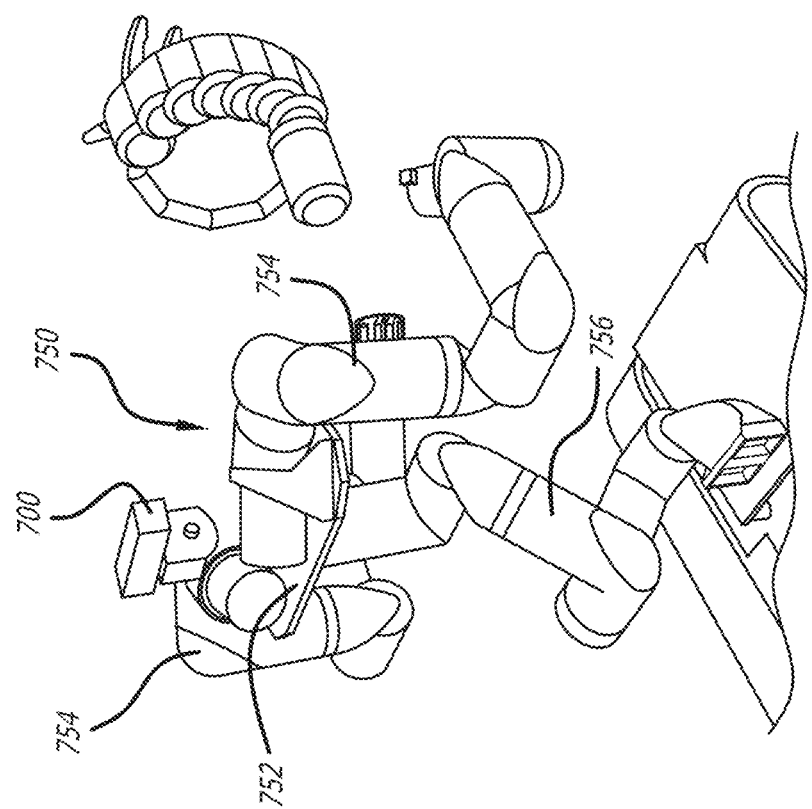
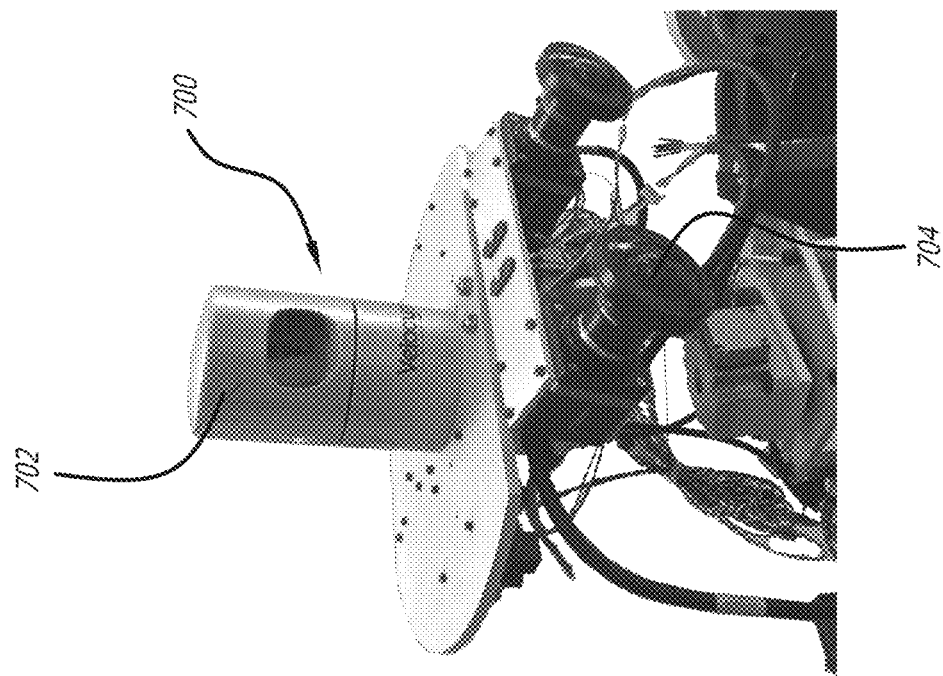
FIG. 7B
FIG. 7A

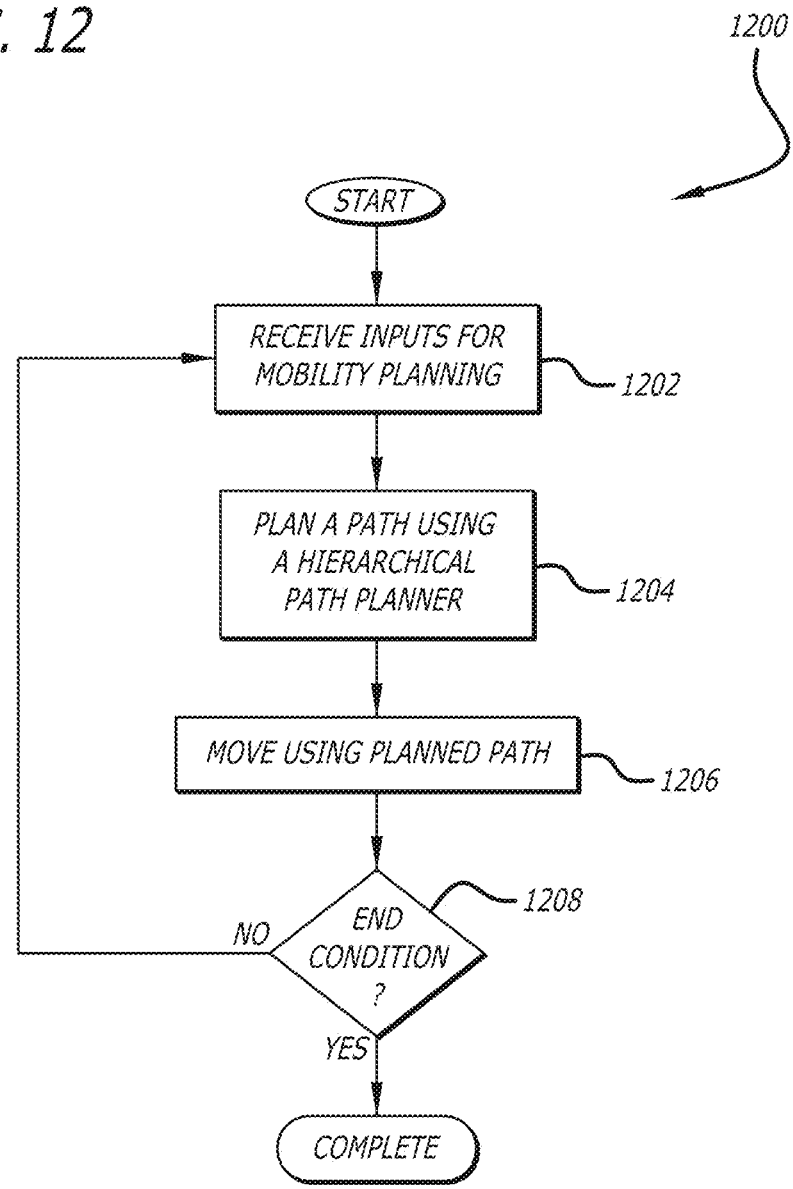

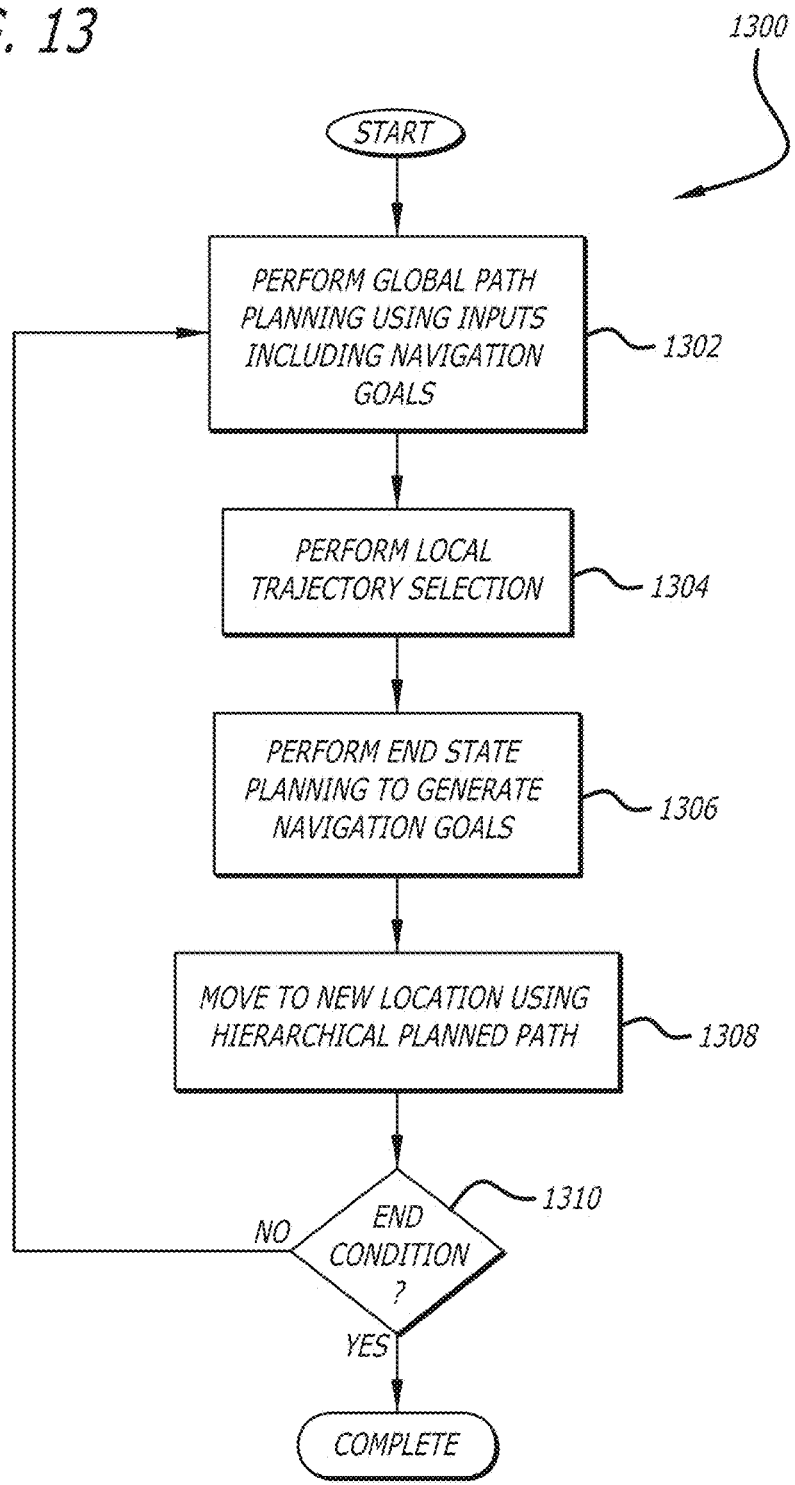

SURROGATE: A BODY-DEXTEROUS MOBILE MANIPULATION ROBOT WITH A TRACKED BASE

CROSS-REFERENCE TO RELATED APPLICATIONS

The present invention claims priority to U.S. Provisional Patent Application Ser. No. 62/029,017 entitled "Surrogate: A Body-Dexterous Mobile Manipulation Robot with a Tracked Base" to Kennedy et al., filed Jul. 25, 2014. The disclosure of U.S. Provisional Patent Application Ser. No. 62/029,017 is herein incorporated by reference in its entirety.

STATEMENT OF FEDERALLY SPONSORED RESEARCH

The invention described herein was made in the performance of work under a NASA contract, and is subject to the provisions of Public Law 96-517 (35 USC 202) in which the Contractor has elected to retain title.

FIELD OF THE INVENTION

The present invention generally relates to dexterous robots and more specifically relates to robots with flexible spines for whole body motion.

BACKGROUND

The term robot is typically used to describe an electromechanical machine that is guided by a computer program. Robots can be autonomous or semi-autonomous and range from humanoids to industrial robots. Mobile robots have the capability to move around in their environment and are not fixed to one physical location. Mobile robots are increasingly being developed for mobility over inhospitable terrain.

A number of robots that utilize manipulators both for mobility and manipulation, including robots built on the ATHLETE and LEMUR robots platforms, have been developed at the Jet Propulsion Laboratory in Pasadena, Calif. with the assistance of a variety of collaborators. The ATHLETE robot incorporates six 6-degree of freedom (DOF) limbs with an additional one degree of freedom wheel as an end-effector. The LEMUR robotics platform was utilized to build the Lemur I and Lemur IIa robots that both included six 4-degree of freedom limbs and the Lemur IIb robot that included four 4-degree of freedom limbs. Research into the advancement of robotics platforms for greater capability and autonomy is ongoing.

SUMMARY OF THE INVENTION

Robotics platforms in accordance with various embodiments of the invention can be utilized to implement highly dexterous robots capable of whole body motion.

Robotics platforms in accordance with one embodiment of the invention include: a processor, a memory containing a whole body motion application; a spine, where the spine has seven degrees of freedom and comprises a spine actuator and three spine elbow joints that each include two spine joint actuators; at least one limb, where the at least one limb comprises a limb actuator and three limb elbow joints that each include two limb joint actuators; a tracked base; a connecting structure that connects the at least one limb to the spine; a second connecting structure that connects the spine to the tracked base; wherein the processor is configured by the whole body motion application to move the at least one limb and the spine to perform whole body motion.

In a further embodiment, the robotics platform further comprises a head, where the head comprises at least one sensor; and a third connecting structure connecting the head to the spine.

In another embodiment, the at least one sensor is a light detection and ranging (LiDAR) system.

In a still further embodiment, the at least one sensor is at least one sensor is a pair of stereo cameras.

In still another embodiment, the three spine elbow joints have the same dimensions and construction.

In a yet further embodiment, the three limb elbow joints have the same dimensions and construction.

In yet another embodiment, the three spine elbow joints and the three limb elbow joints have the same dimensions and construction.

In a further embodiment again, the at least one limb further comprises an end-effector.

In another embodiment again, the end-effector is a hand assembly including a plurality of articulated fingers.

In a further additional embodiment, the at least one limb further comprises a first limb and a second limb.

In another additional embodiment, the first limb further comprises a first end-effector and the second limb further comprises a second end-effector.

In a still yet further embodiment, a kinematic chain for the robotics platform can be evaluated by the processor using the following expression:

$$\min \|\dot{\theta}\|_{2,P_\theta} + \|V_{WE}^B - \tilde{V}_{WE}^B\|_{2,P_E} + \|V_{WC}^B - \tilde{V}_{WC}^B\|_{2,P_C}$$

where $\dot{\theta}$ are joint angle velocities, $V_{WE}^B$ is a base body velocity of the end-effector frame (E) in a world frame W, $V_{WC}^B$ is a center of mass body velocity expressed in a base frame, $P_E$ is a weighting matrix of the end-effector, and $P_\theta$ is a weighting matrix of a regularizer.

In still yet another embodiment, the kinematic chain is subject to joint velocity, torque, and center of support constraints.

In a still further embodiment again, performing whole body motion further comprises end-effector solving and path planning solving.

In still another embodiment again, the head can be articulated to provide range of motion for increasing the field of regard of the sensor payload.

Another further embodiment of the method of the invention includes: visual servoing which can be used alone or in addition to the kinematic solver for end-effector placement.

BRIEF DESCRIPTION OF THE DRAWINGS

FIGS. 4A-4D illustrate the SURROGATE robotics platform utilizing whole body motion including using a limb for stability while picking up an object.

FIGS. 5A-5B illustrate robotic limbs for the SURROGATE robotics platform.

FIG. 6 illustrates a robotic spine for the SURROGATE robotics platform.

FIGS. 7A-7B illustrate a robotic head and how it attaches to the SURROGATE robotics platform respectively.

FIG. 12 illustrates a process for mobility planning utilizing hierarchical path planning in accordance with an embodiment of the invention.

FIG. 13 illustrates a process for hierarchical path planning in accordance with an embodiment of the invention.

DETAILED DESCRIPTION

Figure 1A:
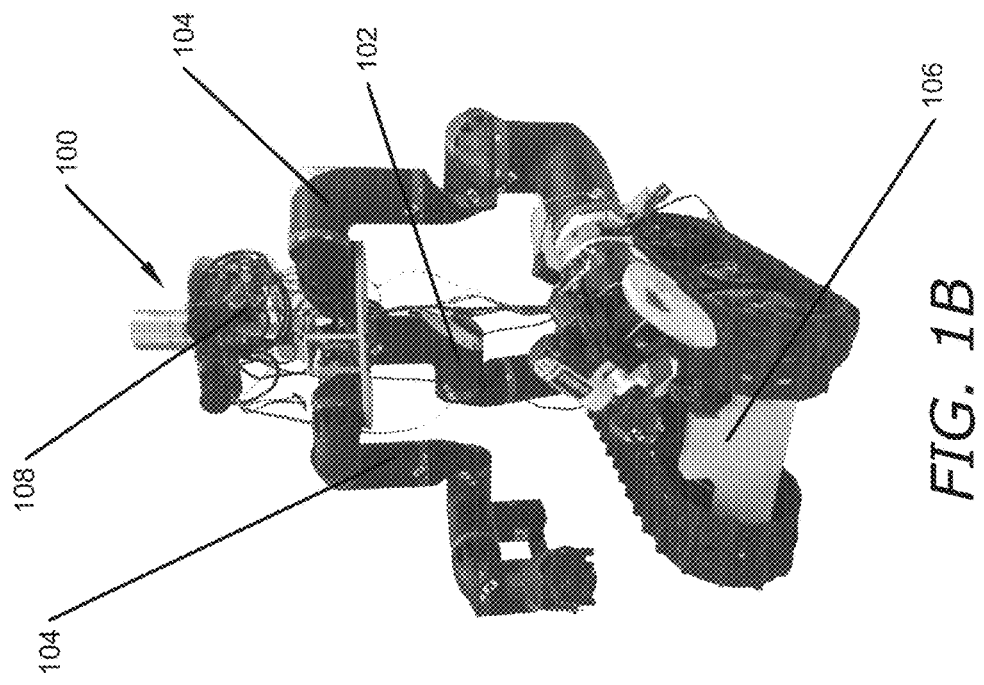
FIGS. 1A-1B illustrate a back and side view of the SURROGATE robotics platform respectively.

Turning now to the drawings, robotics platforms for implementing dexterous robots capable of whole body motion are illustrated. In many embodiments, robots can act autonomously in an unsupervised manner. An autonomous robot is programmed to perform behaviors with little to no human intervention. The robot makes decisions on how to perform tasks on its own. In other embodiments, robots act with supervised-autonomy, or with limited guidance from a human operator. In supervised-autonomy, operators can select behaviors or a series of behaviors for a robot to perform, and the robot decides how to implement these behaviors. In some embodiments, an operator selects these behaviors through a user interface on a remote computer and/or hand-held tablet.

Once behaviors are selected, a robot typically must move to perform the behaviors. Traditionally robots have a fixed body with movable limbs to perform tasks. A robot will move to the desired location and then perform tasks with its limbs. In various embodiments, robots can have a flexible spine which can allow motion in the body of the robot. In some embodiments, this spine can have seven degrees of freedom. A robot capable of whole body motion uses both its limbs and its spine moving concurrently to achieve desired behaviors. These simultaneous limb and spine movements create a highly dexterous robot that can adapt to many situations and environments. In many embodiments, a robot capable of whole body motion will utilize a tracked base. In other embodiments, the robot can utilize actuators and/or other mechanical mechanisms to achieve mobility. In further embodiments, a robot can have a head to house sensors and/or cameras such as a pair of stereo cameras and a Light Detection and Ranging (LiDAR) system which can gather data about the environment to help the robot decide how to implement behaviors.

In several embodiments, the robot will generate two maps: a manipulation map to maintain a detailed model of the world and a long range map for a voxel-based long distance model of the world. Accurate localizations within the models can be implemented using a real-time implementation of an Iterative Closest Point (ICP) process. In various embodiments, a point-to-plane version of the ICP process is utilized.

When the robot moves, hierarchical path planning can take end-state limb and spine poses into account. In some embodiments, a hierarchical path planner has a global grid based planner, a local trajectory selection, and an end-state planner. The global grid based planner can take into account the results of the end-state planner and can use an processes such as D* Lite to plan a broad path around obstacles for the robot. The local trajectory selection refines the planned path. The end-state planner can take desired end-effector poses or camera gaze constrains into account and can generate goals for the global path planner.

While the inventions disclosed herein are capable for adaption for use in a variety of robotics platforms, the SURROGATE robotics platform was designed by the Jet Propulsion Laboratory in Pasadena, Calif. and incorporates many of the inventions and is frequently used for illustrative purposes. SURROGATE has a dexterous spine and is capable of full body motion, and incorporates hierarchical path planning in its motion planning.

While much of the discussion that follows utilizes the SURROGATE robotics platform to illustrate various aspects of the invention, any of a variety of robotics platforms can utilize one or more inventive hardware and/or software systems similar to those incorporated into SURROGATE as appropriate to the requirements of specific applications in accordance with embodiments of the invention. Accordingly, the many inventive aspects of the robotics platform described herein are introduced by first introducing the SURROGATE robotics platform.

1. Introduction to SURROGATE Robotics Platform

Figure 1B:
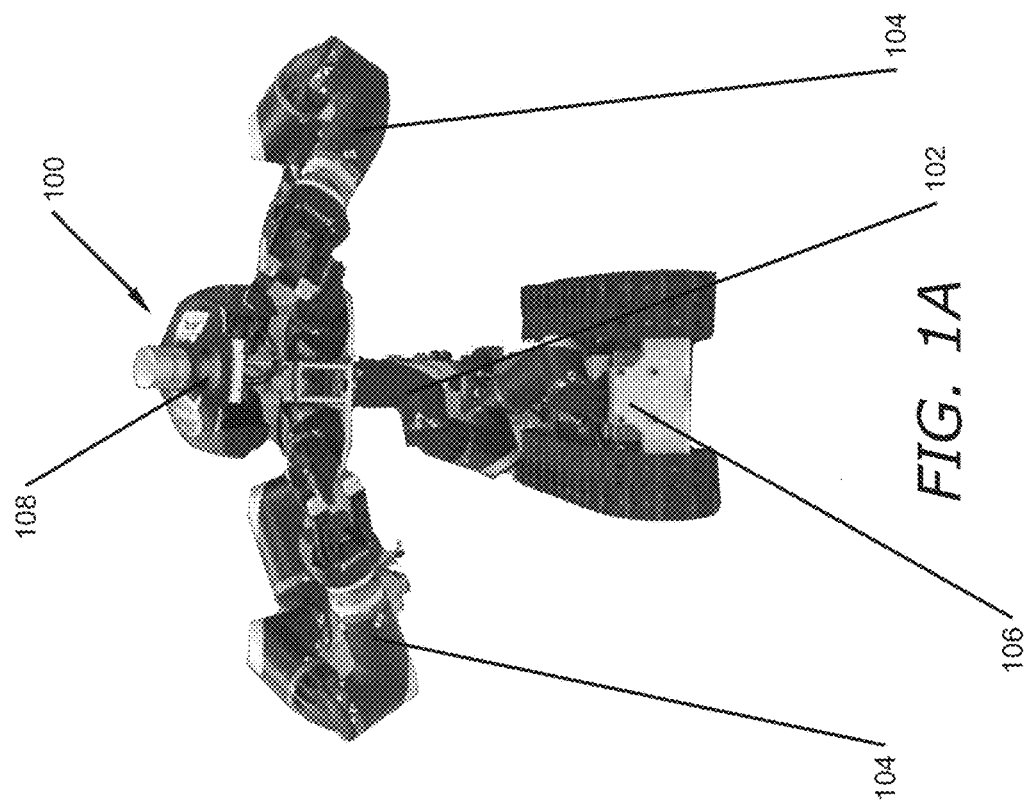

Views of various designs of the SURROGATE robotics platform in a back and a side angle are shown in FIGS. 1A-1B respectively. The SURROGATE robotics platform 100 has a flexible spine 102. This spine 102 connects to two limbs 104, a head 108, and a base 106. The spine and limbs will be described in greater detail below with respect to FIGS. 5A-5B and 6, and can create a highly flexible and dexterous robot. This can allow the SURROGATE robotics platform to perform whole body motion when manipulating end-effectors and/or maneuvering around obstacles. Additionally, the head will be described in greater detail below with respect to FIGS. 7A and 7B. In an illustrative embodiment, the base 106 is a tracked base, but it should be readily appreciated that the base could utilize any number of devices to achieve motion including (but not limited to) wheels and/or additional limbs.

Although various alternative robotics platforms are described above with reference to FIGS. 1A-1B, any of a variety of robots with a flexible spine and limbs can be utilized as appropriate to the requirements of specific applications in accordance with embodiments of the invention. Robotics platforms utilizing whole body motion in accordance with various embodiments of the invention are discussed further below.

2. Flexible Spine and Limbs for Whole Body Motion

Traditionally robots move their limbs and/or end-effectors while their body remains static when performing desired behaviors. Robotic platforms can now engage in whole body motion.

This entails concurrently moving the spine, limbs, and/or end-effectors (as well as actuators controlling these components) to achieve desired behaviors. Whole body motion can provide a greater independence between the end-effectors and the mobility platform by creating a highly dexterous robot that can move into many positions previously unattainable by traditional robotics platforms. Additionally, limbs and/or end-effectors can be used for balance and can also reduce strain on the joints of the robot.

Figure 2A:
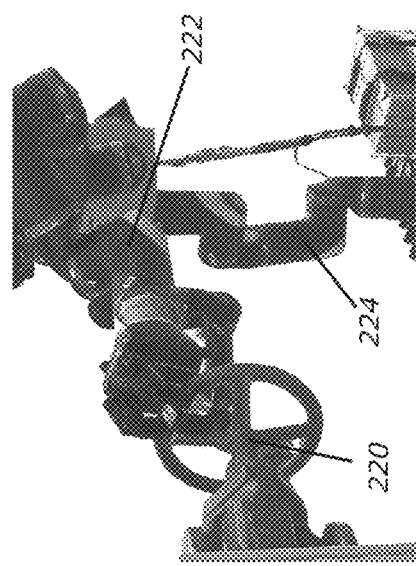
FIGS. 2A-2D illustrate the SURROGATE robotics platform utilizing whole body motion to turn a valve.
Figure 2B:
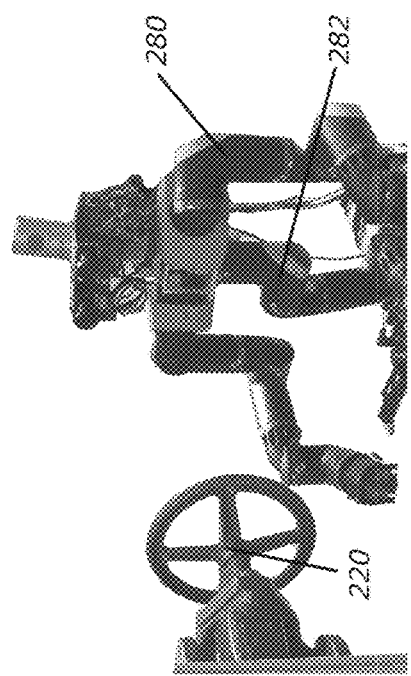
Figure 2C:
Figure 2D:
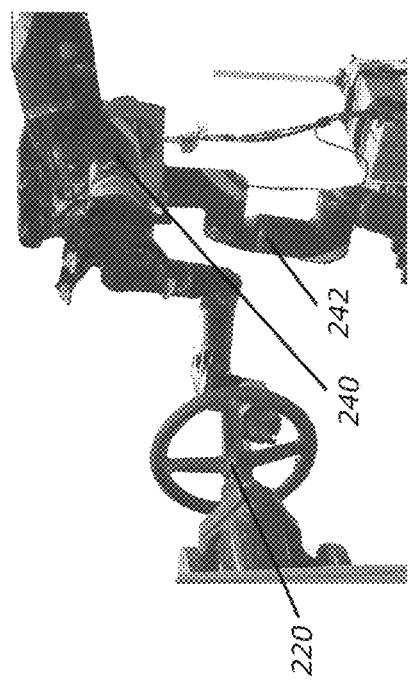

Views of the SURROGATE robotics platform engaging in whole body motion to turn a valve are shown in FIGS. 2A-2D. Robot 200 can be seen beginning to turn a valve in FIG. 2A. Circular wheel-valve is in a first position 202. The end-effector on a limb in a first position 204 is gripping the circular wheel-valve in a first position 202. Spine 206 is additionally in a first position 206 compressed towards the robots base. FIG. 2B illustrates robot 200 as it is turning the circular wheel-valve to a second position 220. To complete this movement, both the limbs and spine have changed positions illustrating whole body motion. In this illustrative example of whole body motion, the spine in a second position 224 elongates to move the limb in a second position 222 upward. FIG. 2C illustrates robot 200 once the limb in a third position 240 has moved away from and released the circular wheel-valve still in the second position 220. The spine in a third position 242 has moved slightly away from circular wheel-valve in a second position 220. Furthermore, FIG. 2D illustrates robot 200 in a resting position once the valve turning motion is complete. The limb in a fourth position 280 and the spine in a fourth position 282 have both contracted and are now closer to the body of robot 200.

Figure 3B:
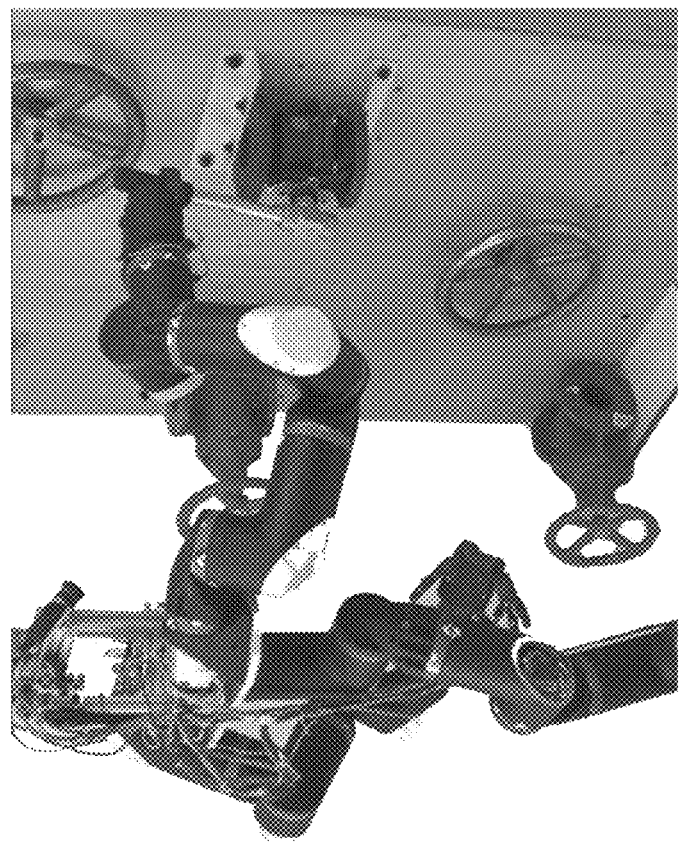
FIGS. 3A-3B illustrate an additional example of the SURROGATE robotics platform utilizing whole body motion to turn a valve.
Figure 3A:
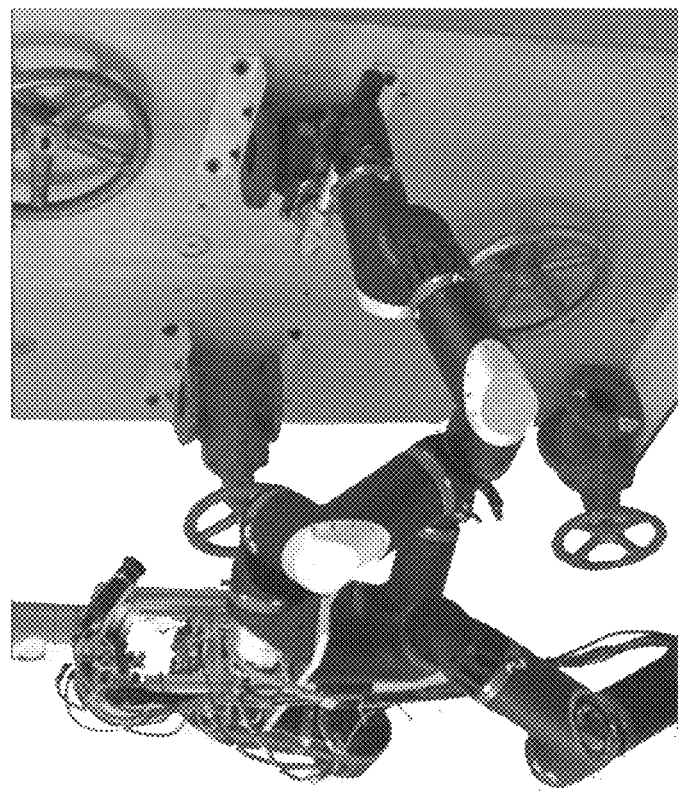

Due to the highly flexible nature of the spine, spine motions can also include (but are not limited to) moving the robot downward, and/or leaning in virtually any direction at various angles. An additional example of the spine and a limb moving together to turn a valve utilizing whole body motion is illustrated in FIGS. 3A and 3B.

Full body motion can also provide stability to the SURROGATE robotics platform. Views of one limb being used to brace the SURROGATE robotics platform while the other limb reaches out to grasp an object are illustrated in FIGS. 4A-4D. Robot 400 can be seen approaching object 402 as illustrated in FIG. 4A. A bracing limb can be seen in a first position 404 in the air. Additionally, end-effector limb with a hand like grasping end-effector is in a first position 408 and the spine is in a first position 410 still near the body of the robot. In this illustrative example, robot 400 can lean over a small wall to pick up object 402, without having to travel around the wall. Bracing limb is in a second position 420 and its end-effector has been placed on the ground to brace robot 400 for the reaching motion as illustrated in FIG. 4B. End-effector limb is in a second position 422 and spine is in a second position 424 as robot 400 begins to lean over the wall towards object 402. Bracing limb has moved to a third position 440 to provide additional bracing support as illustrated in FIG. 4C. End-effector limb has moved to a third position 442 as it grasps object 402. The spine has moved into a third position 444 as it leans over the small wall to increase the reach of the end-effector limb. The bracing limb continues to brace the robot in a fourth position 480 as illustrated in FIG. 4D). The end-effector limb is now in a fourth position 482 and has picked up object 402 and holds it over the far side of the wall. The spine is additionally in a fourth position 484 as the object is held outstretched away from the robot. From here the robot could (but is not limited to) move the object to another position, perform a task with the object, and/or move the object to the same side of the wall as robot 400.

It should be readily apparent that turning a valve and picking up an object are merely illustrative, and whole body motion can be used for a variety of robotic applications including (but not limited to) manipulating tools, opening doors, pushing buttons, and/or manipulating objects after picking them up. Additionally, obstacles the SURROGATE robotics platform can maneuver around can be varied beyond small walls and can include (but are not limited to) walls, rocks, doors, furniture, vehicles, people, animals, bushes, trees and/or other robots. Although a number of robotics platforms with a flexible spine and limbs are described with respect to FIGS. 2-4, any of a variety of robotics platforms utilizing whole body motion as appropriate to the requirements of specific applications in accordance with embodiments of the invention. Limb and spine designs in accordance with various embodiments of the invention are discussed further below.

3. Spine and Limb Design

Traditional robotic designs utilize limbs attached to a rigid base. By using a flexible body, the robot can achieve (but is not limited to) increased motion, greater stability, and/or an increased grasp range (as illustrated in FIGS. 1-4 above). In several embodiments, this flexible body is created by utilizing a spine that is similar in design to the limbs of the robot. In various embodiments, limbs utilized in the RoboSimian robotics platform can be used as both the spine and the limbs in the SURROGATE robotics platform. The RoboSimian robotics platform was developed by the Jet Propulsion Laboratory (JPL) in Pasadena, Calif., and is further described in U.S. patent application Ser. No. 14/637,278 entitled "Robotics Platforms Incorporating Manipulators Having Common Joint Designs", filed Mar. 3, 2015, to Kennedy et al., the disclosure of which is incorporated by reference herein in its entirety.

Typically anthropomorphic robotic design dictates that robotic joints be larger in the proximal location and decrease in size and torque capacity towards the distal end of the limb. This is reasonable because moment loads generated by an outstretched limb or iron cross are greatest at the proximal joints and decrease toward the distal end. Once a robot grasps a rigid object (such as a ladder of vehicle roll cage) with multiple limbs, the forces imparted to the robot's limbs become symmetric. Loads at the distal joints and proximal joints can be equally large and damaging. Therefore, limbs and/or spine in accordance with many embodiments of the invention utilize the same lightweight, high-torque actuator design for each of the joints within the limbs and/or spine.

There are several advantages of using the same joint to construct pieces of the robot: 1) engineering resources can be focused on designing a single high performance actuator; 2) economics of scale resulting from larger quantities of machined parts and commercial off-the-shelf (COTS) components lead to lower production costs as items are ordered in bulk quantities; and 3) field support becomes easier as there is only a single actuator unit to swap out. Repairs can also be simplified as spare components only need to be stocked for one design.

Each limb and the spine in the implementations of the SURROGATE robotics platform illustrated in FIGS. 1A-4D has seven degrees of freedom and can be broken down into simple subcomponents. A limb in accordance with an embodiment of the invention is illustrated in FIGS. 5A and 5B. The limb 500 includes three joints 502 that are configured as elbow assemblies and an azimuth actuator 504 connected to the body 506 of the robotics platform. In the illustrated embodiment, the limb includes a hand assembly 508 as an end-effector in which three articulated fingers 510 can be utilized to manipulate objects. In other embodiments, any of a variety of end-effectors can be utilized as appropriate to the requirements of specific applications.

A joint 502 contains two actuators 512, 514 paired orthogonally with connecting structure 516. The joints are linked together with additional structure 518. In the illustrated embodiment, non-structural elbow caps can be fitted to cover the actuator electronics in each joint and allow easy access to the motor controllers. Caps having molded rubber inserts (elbow pads) can be utilized that protect the structure from scrapes and scratches. In several embodiments, wire harnessing is run through a centerbore of each actuator and down the limb, breaking off at each distributed motor controller. In a number of embodiments, the limb terminates in a 6-axis force/torque sensor that serves as an interface to end-effectors including (but not limited to) various hand assemblies. The mechanical configuration of the limb has the actuators 512, 514 offset in a manner that allows greater than 360 degree rotation, limited only by wire harness twist. This can afford the limb greater flexibility and increases the solution set for a given motion. The offset of the actuators resulting from the elbows in the joints can also have the additional benefit of allowing for compact storage of the limb.

Similarly, the spine has seven degrees of freedom. A spine in accordance with an embodiment of the invention is illustrated in FIG. 6. Spine 600 can also be broken into simple subcomponents, and includes three joints 502. These joints are similar to joints described above with respect to FIGS. 5A and 5B. They are configured as elbow assemblies and have an azimuth actuator 504 to connect spine 600 to base 604 of the robot. As described above in FIG. 5A-5B, a joint 502 contains two actuators 512, 514 paired orthogonally with connecting structure 516. The joints are linked together with additional structure 518. Instead of interfacing with an end-effector, the end of spine 600 interfaces with chest plate 602, which in various embodiments can connect to robot limbs and/or the head of the robot. In several embodiments, the spine is treated as an additional limb for motion planning. Typically robots can only reach as far as their limbs, but when flexible spines are utilized the reach of the robot can be increased to the distance greater than the length of the limb. In many embodiments, the spine is not identical to the limbs and is a different size and/or is made of different components as specific applications require. Although a number of limb and spine designs are described with respect to FIGS. 5A-B and 6, any of a number of robotics platforms with flexible limbs and spines capable of whole body motion can be utilized as appropriate to the requirements of specific applications in accordance with embodiments of the invention. Head designs for robotics platforms in accordance with embodiments of the invention are described further below.

4. Head Design

The head of the SURROGATE robotics platform and how the head connects with the rest of the robotics platform is illustrated in FIGS. 7A and 7B respectively. The head of SURROGATE robotics platform 700 is illustrated in FIG. 7A. The head has perception capabilities and contains a laser-scanner 702 (such as a HDL-32E Velodyne LiDAR) as well a stereo-camera pair 704 (which can be a high-resolution color stereo camera). The perception head also can contain an inertial measurement unit (IMU). In many embodiments, laser-scanner 702, stereo-camera 704, and/or IMU can be mounted on a pan-tilt unit. Head 700 connecting to SURROGATE robotics platform 750 is illustrated in FIG. 7B. Head 700 is mounted on a chest-plate 752. One or more limbs 754 can also be mounted on chest-plate 752. Additionally, chest-plate 752 fixes on top of the spine 756 of the robotics platform. It should be appreciated a variety of cameras and/or other sensors may be placed on the head including (but not limited to) radar, sonar, LiDAR systems, time of flight cameras, and/or structured-light 3D depth sensors. Furthermore, the manner in which the head attaches to the spine in FIG. 7B is merely illustrative and a head can be attached to a flexible spine in any number of ways. Although a number of heads are described with respect to FIGS. 7A-7B, any of a number of heads for robotics platforms can be utilized as appropriate to the requirements of specific applications in accordance with embodiments of the invention. Communications pathways that can be utilized in robotics platform in accordance with many embodiments of the invention are discussed further below.

5. Computer and Networking Architectures

Figure 8:
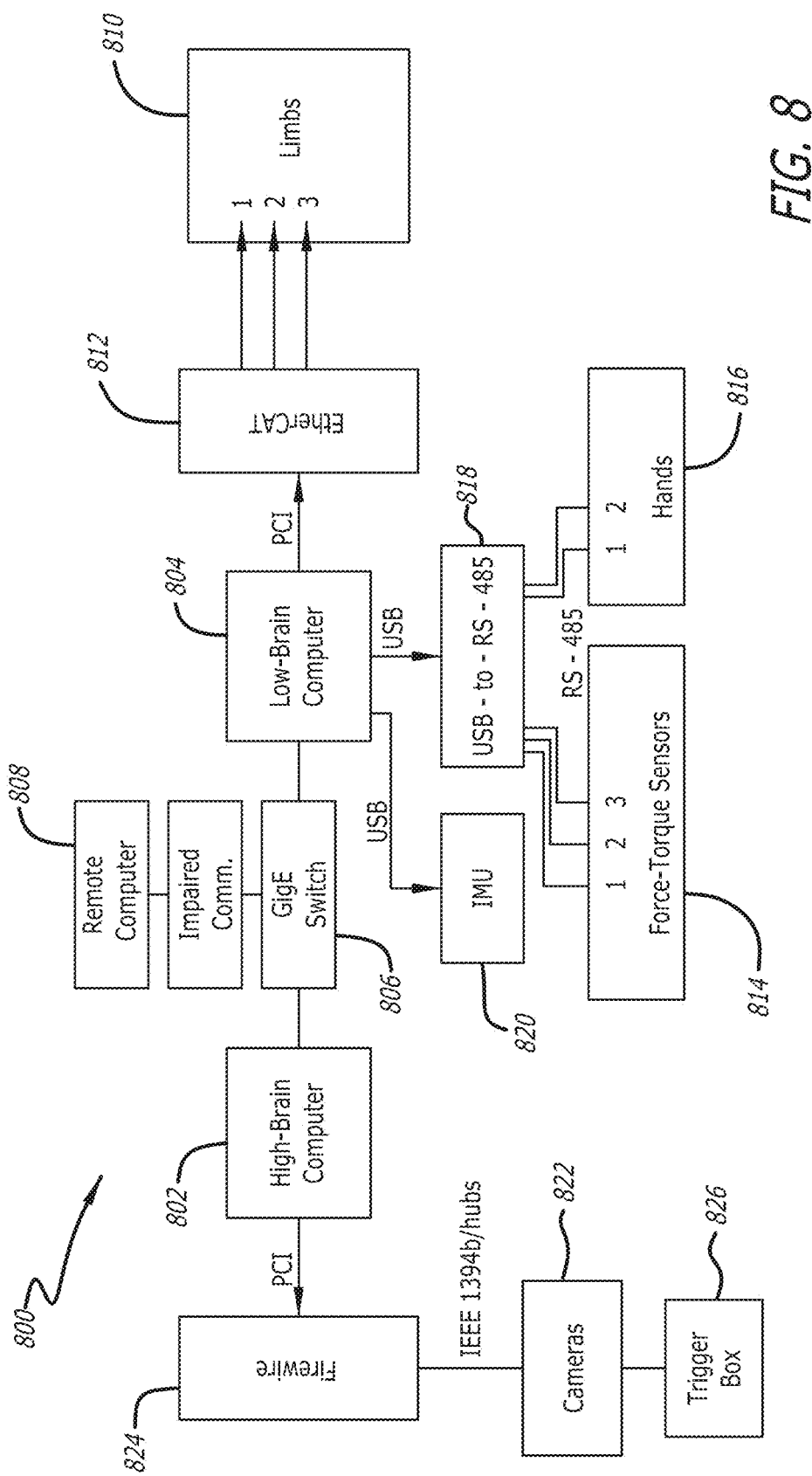
FIG. 8 conceptually illustrates the communication pathways utilized in the SURROGATE robotics platform.

The communications pathways utilized in the SURROGATE robotics platform are described and laid out in FIG. 8. The computer architecture 800 illustrated in FIG. 8 includes a high-brain computer 802 and a low-brain computer 804 networked via a GigE Ethernet switch 806. A remote computer 808 (i.e. the Operator Control Unit) is on the same network and can be connected to the network via a low-bandwidth/high-latency network connection than the network connection between the high-brain 802 and the low-brain 804 computers.

In the illustrated embodiment, the high-brain and low-brain computers 802, 804 communicate over a Gigabit Ethernet link. Each of the high-brain and low-brain computers 802, 804, runs the 12.04 Ubuntu LTS open source operating system on an Intel Quad-Core i7 processor manufactured by the Intel Corporation of Santa Clara, Calif. with 16 GB of memory. The low-brain computer 804 runs a low-latency (soft real-time) kernel and the EtherLabR open-source real-time kernel module, which runs low level processes such as limb and control processes. The high-brain computer 802 is responsible for higher level processes not concerned with real-time execution but rather higher throughput.

The low-brain computer 804 connects and communicates to each limb 810 (where it should be readily appreciated that the spine can be viewed as a third limb for whole body motion) through an Ethernet physical link layer 812. Control and communication to each limb as is achieved through the EtherCATR protocol. Using a tree topology of the Ether-CATR network, each limb is a segment of the network and each join in the limb is a slave along the network segment. The low-brain computer 804 also communicates to three force-torque sensors 814 that are placed at the end of each limb 810 just before each hand (not shown). In several embodiments, the force-torque sensors are force-torque sensors manufactured by ATI Industrial Automation of Apex, N.C. In other embodiments, any of a variety of sensors can be utilized to gather data with respect to the limbs as appropriate to the requirements to the requirements of specific applications. Sensors can communicate to the low-brain computer 804 via RS-485 as the physical layer of the Modbus protocol using a twisted pair down each limb. The hand controllers 816 can also communicate via RS-485 to the low-brain computer 804. In several embodiments, a RS-485 to USB interface converter 818 is utilized to interface the RS-485 connections with the low brain computer 804. The IMU 820, a VectorNav VN-200 Rugged internal navigation system (INS), is also connected via USB to the low-brain computer 804.

The high-brain computer's main connectivity is with the cameras 822. The high-brain uses a PCI express splitter 824 that connects multiple Point Grey Research IEEE 1394b PCI express cards, with each card having two IEEE 1394b ports.

Each port is then connected to a Point Grey Research 5 point IEEE1394b hub connecting the stereo pair of cameras. In several embodiments, the stereo camera pair is implemented using Point Grey Research Flea2 cameras. In many implementations the stereo pair is externally triggered via a signal generator 826 that emits a 10 Hz square wave signal. While one stereo camera pair is described above with respect to FIG. 7A, it can readily be appreciated that many stereo camera pairs can be utilized as specific applications require.

Although not shown, robots implemented using the SURROGATE robotics platform can incorporate additional active depth sensing technologies including (but not limited to) radar, sonar, LiDAR systems, time of flight cameras, and/or structured-light 3D depth sensors. In one implementation, a robot constructed using the SURROGATE robotics platform includes a HDL-32E LiDAR manufactured by the Velodyne LiDAR of Morgan Hill, Calif. mounted on the head of the robot as described above in FIG. 7A. In many embodiments, a dedicated processor and/or system-on-chip receives data captured by the active depth sensor and provides processed distance measurements and/or image data to the high-brain computer via an appropriate network connection. In other embodiments, the high-brain computer directly processes raw data obtained by active depth sensors.

As can readily be appreciated, any of a variety of computing platforms, network architectures, sensors, and camera configurations can be utilized within robotics platforms in accordance with embodiments of the invention. The specific processing, data communication, sensor information gathering capabilities, and machine vision system utilized in a specific robot are largely dependent upon the requirements of a particular application. Software architectures that can be executed by computing hardware within robotics platforms to perform various processes in accordance with embodiments of the invention are discussed further below.

6. Software Architecture

The software architecture and processes utilized by the SURROGATE robotics platform are designed to enable low-bandwidth, high latency control of a highly capable robot. In many implementations, the robot is capable of performing basic behaviors, such as moving to a designated location, grasping an object, and/or performing manipulation tasks autonomously. In many implementations, the software utilized in the SURROGATE robotics platform is model-based and data driven. In several implementations, the robot's software includes multiple processes running simultaneously on one or more computers inside the robot and/or on one or more remote computing systems. The operator is often responsible for designating and sequencing robot behaviors to perform complex tasks, such as turning a door handle, opening a door, turning a valve, and traversing through a doorway. The operator may be at a standoff location, without line-of-site to the robot, and without a high bandwidth connection to either the robot or to a central command center. Therefore, the amount of processing on the operator control unit (OCU) is designed to be handled by a single standard laptop computer and/or single tablet, and still provide sufficient situational awareness to the operator to perform complex tasks. The OCU will be described in greater detail further below with respect to FIGS. 15A and 15B. Although the SURROGATE platform is described above as requiring a human operator, robots can be implemented in accordance with many embodiments of the invention that operate autonomously with little or no supervision.

Figure 9:
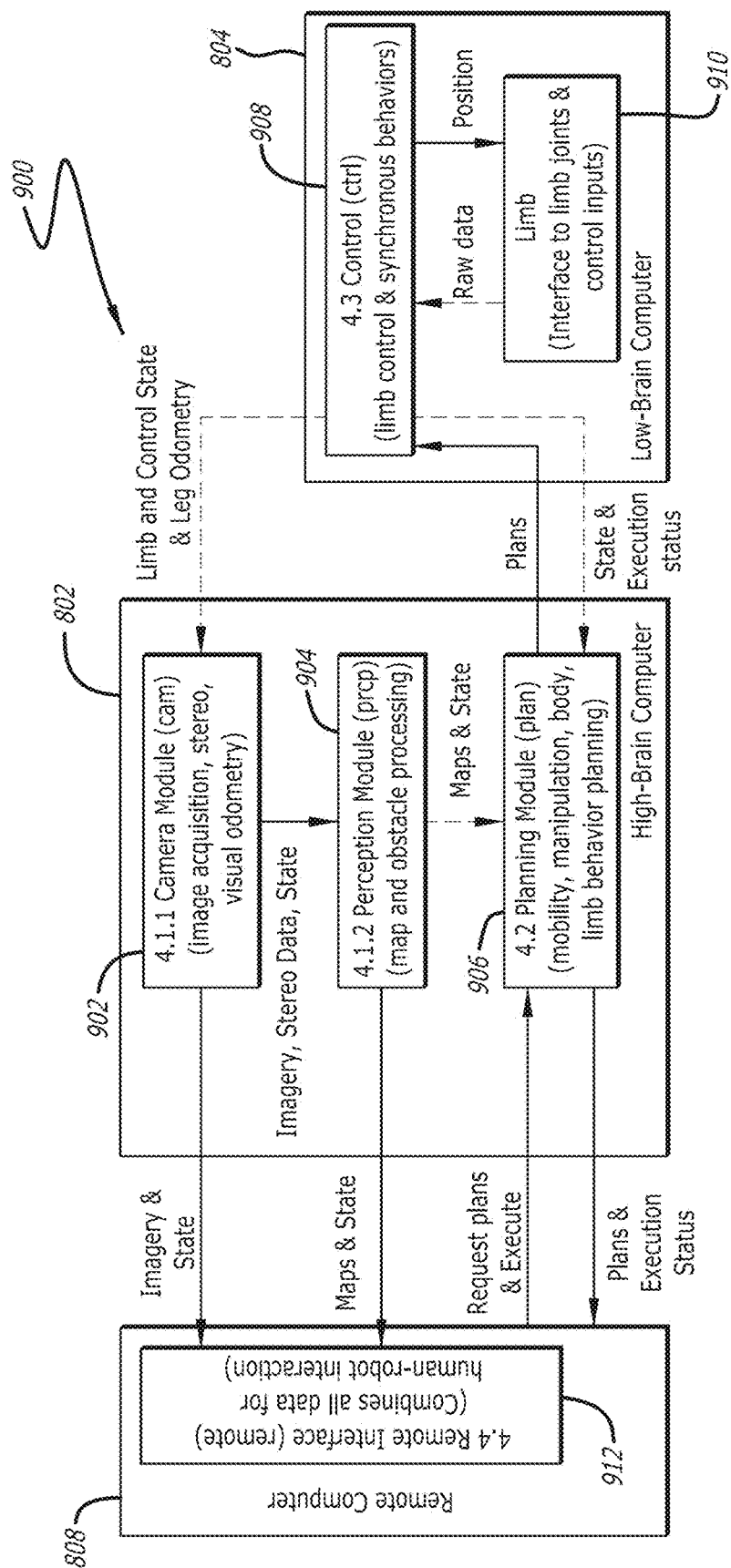
FIG. 9 illustrates a software architecture utilized on a robot implemented using the SURROGATE robotics platform.

A software architecture utilized on a robot implemented using the SURROGATE robotics platform is illustrated in FIG. 9. The software architecture 900 includes processes that communicate with each other via shared-memory and/or inter-process communication. In the illustrated embodiment, inter-process communication (IPC) occurs either through TPC or UDP. With IPC communication, each module subscribes to other modules' messages, which are sent asynchronously. Messages and data that can be sent as a constant stream are sent via UDP while one-off messages or messages requiring receipt confirmation are sent via TCP. Data products that are both large in size and sent as a stream are sent via shared-memory. Imagery and stereo data are sent via shared memory.

The software modules incorporated within the software architecture illustrated in FIG. 9 include a mechanics modeling (model) module that provides the infrastructure to create, modify, and query a model of the world and robot, and is used in almost all of SURROGATES's modules. The camera module 902 acquires imagery from the stereo camera, computes stereo range images, and performs visual odometry. The perception module 904 takes the image data and produces map and scene information. The plan module 906 produces feasible mobility and manipulation plans. The control module 908 executes the generated plans and behaviors by commanding the limbs (where it can be readily appreciated that the spine can be controlled in a similar manner as a limb) though the limb modules 910. Lastly, the remote module 912 is the remote user-interface that enables an operator to view robot data and command the robot.

FIG. 9 graphically illustrates the processes and where they run, as well as the data they share and how they share it. Each light-grey colored block represents a separate software module/process and each arrow indicates the flow of data between each module. Each dark-grey colored block represents the computing system on which each process runs. Solid, dashed, and dotted lines represent TCU, UDP, and shared-memory connections, respectively.

Although specific processes are shown as running on specific computing systems in FIG. 9, the type and number of processes, type and number of computing systems, and the computing systems on which the processes are run are largely dictated by the requirements of the specific application. Processes for generating short and long range maps in accordance with embodiments of the invention are discussed further below.

7. Perception Module

As described above, the SURROGATE robotics platform can be equipped with a head consisting of a high-resolution color stereo-camera pair, a Velodyne laser-scanner (HDL-32E), and an IMU all mounted on a pan-tilt unit. The perception system module is responsible for 3D map building, 6-DOF object localization, and pose estimation.

Two voxel-based 3D maps of the environment can be maintained, namely the manipulation and long-range perception map. The manipulation map is utilized to maintain a detailed, high resolution model of the world. This is used to determine obstacles in the workspace of the robot. Obstacles are segmented out of the map and represented as convex hulls for fast collision detection during manipulation planning. The manipulation map is also used to provide detailed situational awareness to the operator and compute 6-DOF object poses of known objects in the environment. The object pose is determined by matching the contours the of known object model against the contours in the acquired image. To facilitate the object detection process and leverage the "guided autonomy" (or supervised autonomy) available from the human operator, a region of interest and object type is only required as inputs from the user to fit the object. Together with the manipulation map, this provides an accurate enough estimate of the object pose to complete manipulation tasks, such as grasping the J-CAD chemical detector or turning the circular wheel-valve. The full 3D and high resolution nature of the manipulation map together with the real-time requirements of the system often requires the map size to be limited to the robot's workspace.

The long-range map uses the same voxel-based representation though with typically lower resolution to extend the map into further distances. Range measurements acquired from the Velodyne sensor are used to populate this crude map which gives full 360° coverage around the robot. This particular map is used in mobility planning and overall situational awareness.

The pose estimation on SURROGATE is primarily stereo-vision based visual odometry coupled with an INS solution for orientation provided by the IMU. However, pure stereo-vision with an IMU proved inadequate in providing accurate 6-DOF pose of the robot, primarily due to the majority of manipulation tasks often involving the robot arms coming into view of the stereo cameras. This has the undesired effect of either causing occlusions, creating phantom motions from tracked features on the arm of the robot, or creating unmodeled high-frequency dynamics of the robot unable to be captured by the slow framerate of the cameras. To mitigate this problem, a secondary form of pose estimation was fused with the existing pose estimator (stereo camera pair with IMU) on the SURROGATE platform using LiDAR point clouds with scan registration.

8. Pose Estimation from Scan Registration

Figure 10B:
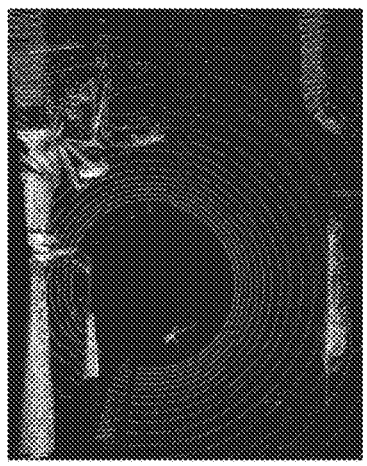
FIGS. 10A-10D illustrate laser-scan data processing.
Figure 10D:
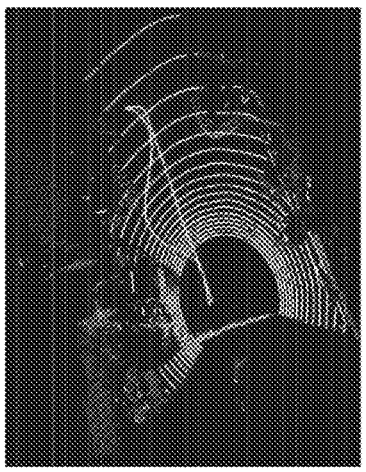
Figure 10A:

To provide the platform with accurate localization in all lighting conditions an addition to the visual odometry (VO) system, a LiDAR based odometry system (LO) can be utilized. LO consists of a real-time implementation of the Iterative Closest Point (ICP) algorithm, in particular the point-to-plane version of ICP. In many embodiments, the implementation is single core, without hardware acceleration, and can produce a registration of two full Velodyne scans in 50 ms on average. FIGS. 10A-10D illustrate laser-scan data processing. FIG. 10A illustrates segmentation of a single scan where colors are mapped to segment ids and the ground is removed for clarity. The stereo cloud provided by the stereo pair on the sensor head is also shown at the center of the image to illustrate the difference in field of view between the two sensors, which contribute to more robust LO registration compared to VO. An example of the LO trajectory is shown in FIG. 10D. The LO path is illustrated in green, and it can be seen that the robot came back to the same position as it started from where the resulting drift was approximately 10 cm over a 10 m long trajectory.

In many embodiments, an approach is to utilize LiDAR based odometry which can be summarized in two simple steps: a fast approximate nearest neighbor search for point association followed by a ground/non-ground segmentation step to lock in certain DOFs of the pose.

9. Fast Approximate Nearest Neighbor Search

ICP takes as an input a pair of scans: a model scan and a test scan. The model scan is kept fixed while the transform that allows the alignment of the test scan onto the model scan is estimated. The first step in each ICP iteration consists of finding point associations between the test and the model scan. This is usually implemented as a nearest neighbor (NN) search and is often the main bottleneck in terms of speed. Efficient 3D data structures such as kd-trees or oct-trees have been used to limit computation times. These typically result in NN search times of the order of 100 ms for single test scan matched to a single model scan, in the case of 360° Velodyne HDL-32E scans. In several embodiments, these are down-sampled through a simple polar grid and contain about 60K points each. The aim here is to perform ICP in less than a 100 ms window so that 10 Velodyne scans per second can be processed (i.e., run real-time). An ICP function call typically requires 20 to 30 NN searches. This means that NN search times of 5 ms or less are aimed for. To achieve the model scan is simply voxelized using a 3D grid. The voxel size in this grid is defined by the ICP distance threshold: the maximum allowed distance between a test point and its associated model point. Each voxel maintains an average of the model points in it. A NN search thus simply requires projecting tests points into the 3D model grid and only involves index lookups. This is fast and allows achieving the targeted computation times of ≤5 ms.

10. Exploiting Segmentation

Figure 10C:
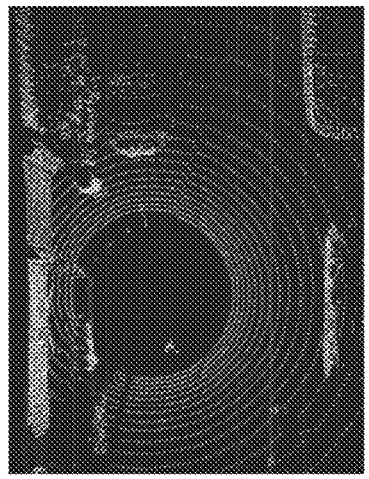

ICPs behavior is fairly sensitive to the point correspondences found during NN searches: ICP may diverge depending on the subset of point correspondences used to estimate the transform. To increase the algorithm robustness the Velodyne segmenter can be exploited. This segmenter provides ground and non-ground segments. In many embodiments, the second part of the algorithm, which aims at segmenting objects once ground points have been removed, is entirely performed in the range image as opposed to using an intermediate voxel grid. Neighbor lookups are thus significantly faster, which results in segmentation times of about 15 ms per scan. This is an order of magnitude faster than the original implementation. The ICP implementation leverages the resulting segmentation to first align ground points in the test scan to ground points in the model scan. In a second phase, while ground alignment is maintained, only non-ground segments are aligned. FIG. 10B illustrates point associations selected between non-ground segments only during this second phase. FIG. 10B can further be described as illustrating an ICP registration where white lines indicate point-to-plane associations. This segmentation based approach to alignment implicitly decreases the number of transform components estimated during each of these two phases and thus facilitates ICP convergence. The "ground" phase essentially estimates the roll, pitch and z displacement of the registration while the "non-ground" phase estimates the remaining components. Overall, the alignment of two scans takes about 50 ms on average: segmentation takes 12 ms, normal computations (for point-to-plane distances) takes 7 ms, and ICP takes about 30 ms. The output of this alignment process is illustrated in FIG. 10C, which can be alternatively be described as illustrating ICP registration with the two scans correctly aligned.

11. Non-linear Optimization for Line Registration

The linear approximation made by ICP during the estimation of the transform limits the section of the SE(3) space ICP is able search. In many embodiments, a final non-linear optimization step is added to further refine the estimated transform. An open-source IPOPT non-linear solver can be utilized. The down side of a nonlinear approach compared to its linear counterpart is that it is significantly slower. However, the speed of the non-linear solver is approximately linear in the number of points it has to process, and thus computation times can be limited by passing to the non-linear solver a small sub-set of points. With a strategic selection of this sub-set, accuracy can also be maintained. Given that the non-linear solver is used after the two phases of ICP described above, by this stage, the estimated transform is accurate enough that the majority of point correspondences is correct. Given this assumption, only associated points with a larger distance between them are selected. This forces the solver to correct for and focus on these larger displacements. In several embodiments, the points associated with the largest K distances (K set to 100) are used. Overall, the alignment of two scans takes about 50 milliseconds on average: segmentation takes 12 msec, normal computations (for point-to-plane distances) takes 7 msec, and ICP takes about 30 msec.

12. Modeling Module

The modeling layer provides several functions to the system. The first function is to provide visual models for drawing of the robot and object models in the OCU interface using OpenGL™. The second function is to provide collision detection capability using the third-party software Bullet. The third function is to provide a kinematic model such that kinematic quantities can be easily computed.

A model manager provides the management of this layer, and maintains the state of the kinematic, geometric, and physical quantities of not just the robot but also objects and the environment. For fast collision detection, the robot model and object models are modeled using primitive objects such as boxes, cylinders, and spheres. Collision detection with the world can be done using the Bullet collision detector library since the perception system produces both bounding boxes and simplified convex hulls of segmented portions of the world map. The model manager also provides functions for kinematic requests such as forward and inverse kinematics (described further below), Jacobians, center of mass, and collision information.

13. Behaviors

Figure 11C:
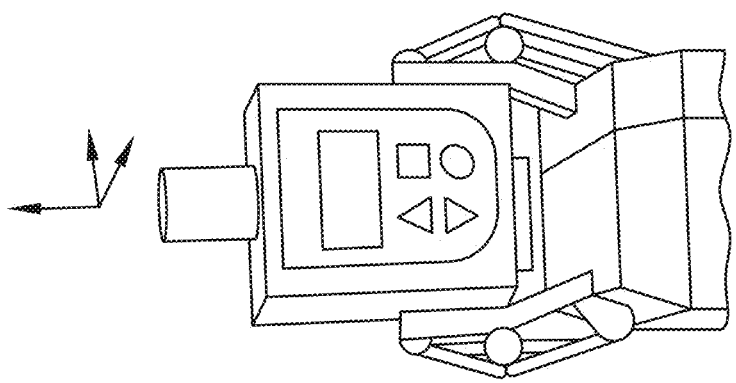
FIGS. 11A-11C illustrate a push button behavior, a rotate behavior, and a twist behavior respectively.
Figure 11B:
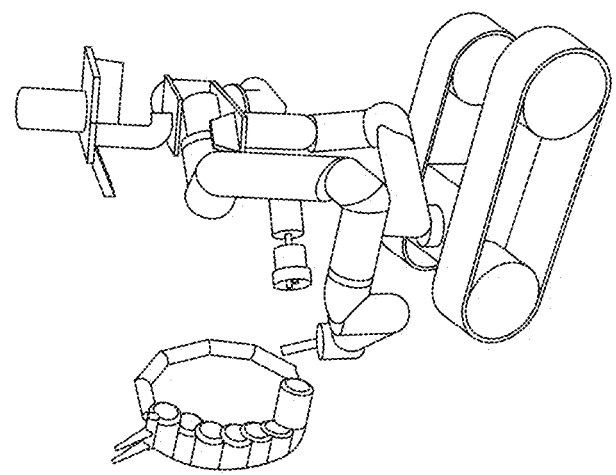
Figure 11A:
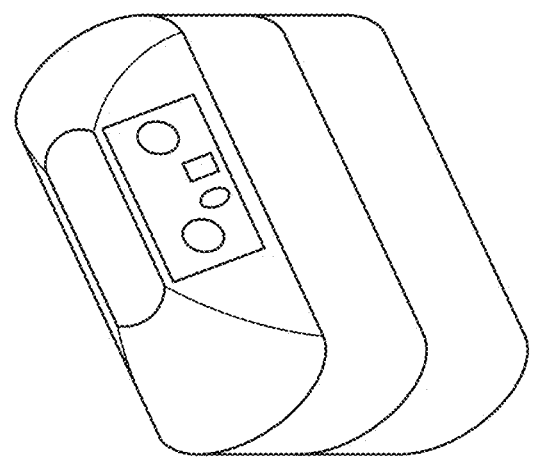

In order to pass intent to the robot, the operator of the SURROGATE robotics platform requests behaviors through the operator control unit. At the highest level, behaviors can be requested/constructed by specifying one or a combination of the following specifications: desired end effectors, their poses, robot body pose, and objects in the world reference frame. Behaviors that operate on objects can be parameterized by defining attributes of the object. For example, to specify the behavior to rotate a valve, the valve can be represented by a torus' radius whose central axis also serves to define the rotary motion of the rotation behavior. In other circumstances, for a certain object, a grasping behavior can predefine end-effector poses that represent grasp points based on the object's geometry. Objects with features, such as buttons, can also help define other behaviors such as "pushing a button" by their feature location on the object model. FIGS. 11A-11C illustrates these various specifications. FIG. 11A illustrates a button feature on an instrument panel, which defines the button push behavior. Similarly, FIG. 11B shows the rotate behavior on a valve that can be parameterized according to the diameter. Additionally, FIG. 11C illustrates the twist behavior which is characterized by a rotational axis.

At a lower level, the behavior system is essentially represented by an asynchronous hierarchical state machine which defines control goals at a task frame and monitors the execution during the synchronous control loop. In the behavior state machine, a single finite state is defined as an action. Each action is defined by a set of controllers (e.g. force setpoint along a particular axis) and end conditions (e.g. end at a particular force value on another axis). The controllers dictate motions, positions, and force and torque setpoint goals at the chosen task frame. End conditions determine the completion or failure of these controllers and determine the transitions in the finite state machine to the next action of the behavior. This translation from higher level intent to a state machine of actions, allows a precise set of controllers and end conditions to be used in the Generalized Compliant Motion (GCM) framework inside the control loop.

Fundamental behaviors (e.g. grasp, lift, release) can be added into a sequence easily for the operator and the on board system is completely agnostic to the use of a sequence or a single behavior. This allows each behavior to a have simple transition and well defined conditions aiding the user to test and develop more complicated sequences of behaviors. Note that this ability to use both single behaviors and sequences of behaviors is the key framework allowing the SURROGATE robotics system to transition from heavy user teleoperation (single behaviors) towards full robot autonomy (longer sequences) as capabilities on the platform become more intelligent.

14. Planning Module

Planning for manipulation is ultimately dictated by the behavior the system wants to execute. At the highest level, for a behavior request, a dedicated behavior planner is invoked which takes the high level kinematic requirements of the behavior such as end effector goals, robot body pose, and expected motion of the behavior. For example, in considering a manipulation behavior, the goal is to determine the best end effector pose, robot pose, and starting angles to perform the entire manipulation task. Therefore, the planner can alter the user specified goals such that the entire motion is achievable. The planner can discretize the search for certain behaviors (e.g. grasp points around a valve).

The behavior planner for manipulation first determines an initial inverse kinematics (IK) solution to the start of the behavior, from which it then tests feasibility. For each initial IK solution of each discrete goal, a cost is associated with the difference in joint angles from the current state to the initial IK state. Each solution is ranked first by the percentage of the desired motion that is feasible and then ranked according to the joint-angle cost.

15. Whole-Body Planning

Given the kinematic nature of the SURROGATE robotics platform, with an open link kinematic chain of 21-DOFs, inverse kinematics becomes a challenging problem both for planning purposes but also for real-time controlling purposes (see further below for details). This kinematic problem is formulated as a quadratic program (QP) with linear constraints, such as self-avoidance collisions, torque (accelerations and velocity) limits, gaze directions, and stability. The problem can be formulated by minimizing the following:

$$\min \|\dot{\theta}\|_{2,P_\theta} + \|V_{WE}^B - \tilde{V}_{WE}^B\|_{2,P_E} + \|V_{WC}^B - \tilde{V}_{WC}^B\|_{2,P_C} \quad (1)$$

where $\dot{\theta}$ are the joints angle velocities of the robot, $V_{WE}^B$ is the base body velocity of the end effector frame (E) in the world frame W and $V_{WC}^B$ is the center of mass body velocity expressed in the base frame. The first term is the regularizing term and matrices $P_E$ and $P_\theta$ are weighting matrices of the end effector and regularizer, respectively. The minimization is subject to joint velocity, torque, and center of support constraints.

16. Mobility Planning

A process for robotic mobility planning using a hierarchical path planner is illustrated in FIG. 12. The process 1200 includes receiving (1202) inputs for mobility planning. These inputs can include a variety of data including (but not limited to) [list of data for mobility planning here]. A path for SURROGATE is planned (1204) using a hierarchical path planner. The hierarchical path planner with be discussed in detail below with respect to FIG. 13. SURRO- GATE moves (1206) using the planned path. If an end condition has been reached (1208), mobility planning is complete. Otherwise, if an end condition has not been reached (1208), SURROGATE receives (1202) additional inputs for mobility planning. These additional inputs typically include information from the hierarchical path planner. Although many processes for robotic mobility planning are described above with reference to FIG. 12, any of a variety of processes can be utilized to plan the motion for a robotics platform as appropriate to the requirements of specific applications in accordance with embodiments of the invention. Processes for hierarchical path planning in accordance with many embodiments of the invention are discussed further below.

Figures 14A, 14B, 14C:
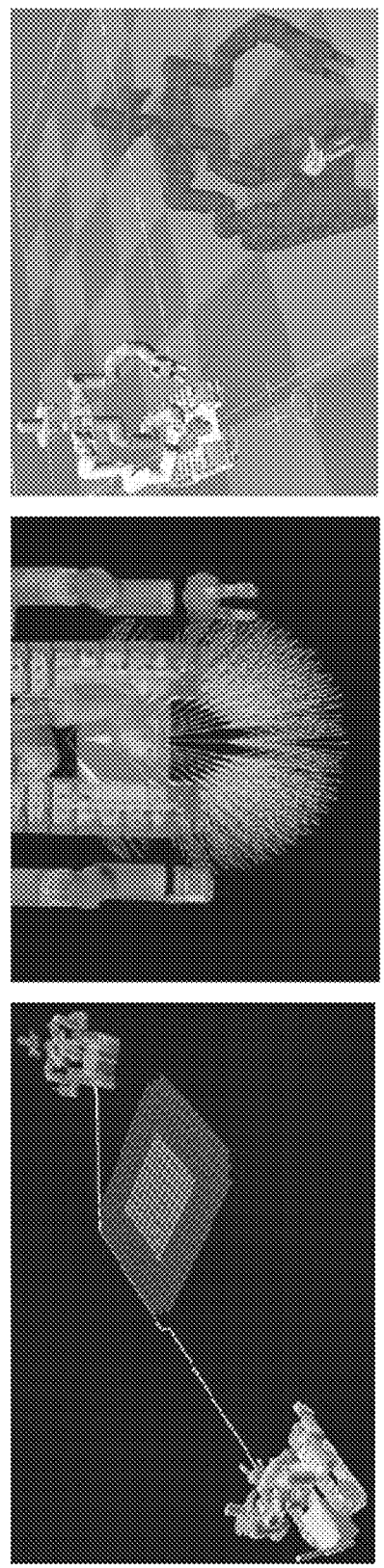
FIG. 14A illustrates global path planning.
FIG. 14B illustrates local trajectory selection.
FIG. 14C illustrates end-state planning.

A process for hierarchical path planning is illustrated in FIG. 13. The process 1300 includes performing (1302) global path planning using inputs including navigation goals. Global path planning is described further below in section 17 and is illustrated in FIG. 14A, and can generate a broader high level path while avoiding large obstacles. A variety of known path planning processes can implement global path planning including (but not limited to) the widely utilized A*, B*, D*, and/or D* lite. Local trajectory selection is performed (1304). Local trajectory selection is discussed in detail further below in section 18 and is illustrated in FIG. 14B. Local trajectory selection typically selects a more precise path than global path planning. End state planning is performed (1306) which generates navigation goals. End state planning is discussed in detail below in section 19 and is illustrated in FIG. 14C. It typically includes [something about possible end-effector positions and camera gazes] and uses these to generate navigation goals. SURROGATE moves (1308) to a new location using the hierarchical planned path. If an end condition has been reached (1310), hierarchical path planning is complete. If an end condition has not been reached (1310), global path planning is performed (1302) using inputs including navigation goals generated with end state planning. Although a process for hierarchical path planning is described with reference to FIG. 13, any of a number of processes that utilize the end states of the robotics platform in path planning as appropriate to the requirements of specific applications in accordance with embodiments of the invention.

Mobility planning consists of a hierarchy of three different planners i) a global grid-based path planner ii) a local trajectory selection scheme that enables path following while taking into account kino-dynamic constraints iii) an end-state planner that is capable of auto-generating navigation goals given desired end-effector poses and/or camera gaze constraints. The autogenerated navigation goals are used as inputs into the global path planner.

17. Global Path Planning

Global path planning is performed on 2D grids with the world classified as obstacle and obstacle-free cells in a binary fashion. FIG. 14A illustrates global path planning with D* Lite. Obstacles are shown in red, and dilated pixels are shown in dark red (obstacle dilation accounts for size of the robot's base). The D* Lite process is used to perform a graph search given a desired {x,y} goal. D* Lite expands nodes in a depth-first fashion backwards from the goal instead of forwards from the start location. This backwards expansion enables efficient replanning in a dynamic fashion as the robot moves and the latest estimate of the world changes.

18. Path Following with Local Trajectory Sets

The role of a reactive local planner was to generate a local trajectory to track a global path while taking into account the kino-dynamic constraints of the robot. A set of trajectories were generated offline by diffusing a set of control inputs at multiple depths (creates a combinatorial tree of control inputs). FIG. 14B illustrates local planning via a discrete set of trajectories. The best trajectory from the fixed set was constantly updated in a reciding horizon fashion at a fixed rate as a function of the least tracking error to a global path. In the reciding horizon paradigm, the first control input of a chosen trajectory is sent to the robot and the next best-case trajectory is selected after executing the first control input.

19. End State Search

End state planning searches for a feasible robot state given a desired end effector pose and/or camera gaze constraint. Camera gaze constraints typically enforce that the manipulation hand is in a conic field of view. The search is posed as a non-linear programming problem as defined below and is solved using an open-source interior point method based non-linear optimization package (IPOPT). FIG. 14C illustrates end-state planning which includes searching for a feasible robot state (magenta) given end effector (orange hand) and/or camera gaze goals.

$$\{x^*_{base}, \theta^*\} = \underset{x_{base}, \theta}{\operatorname{argmin}}\{(\theta - \theta_{nom})^T(\theta - \theta_{nom})\}$$

s.t.

$$LB \le c_{pos}(fk_{ee}(x_{base}, \theta), x_{ee\_desired}) \le UB$$

$$LB \le c_{orient}(fk_{ee}(x_{base}, \theta), x_{ee\_desired}) \le UB$$

$$LB \le c_{gaze}(fk_{cam}(x_{base}, \theta), x_{gaze\_target}) \le UB$$

where $\theta$ is joint angles, $x_{base}$ is the body pose in world frame, and $fk_{ee/cam}$ functions represent the end effector and camera forward kinematics. $x^*_{base}$ is the optimized body pose in world frame, and $\theta^*$ represent the optimized joint angles. $x^*_{base}$ is used as a navigation goal into the dstar path planner discussed above. $c_{pos}( )$, $c_{orient}( )$, $c_{gaze}( )$ are position, orientation and camera gaze constraint functions. $c_{pos}( ) \le 0$ is represented by the Euclidean distance metric. $c_{orient}( )$ is represented by $\cos(tol) - 1 \le 0.5*\operatorname{Trace}((R_1^W)^T R_2^W) - 1 \le 0$ where $R_1^W$ and $R_2^W$ are two rotation matrices. $c_{gaze}( )$ is represented by $$\cos(tol) - 1 \le \left(\frac{p_{tar} - p_{cam}}{\|p_{tar} - p_{cam}\|}\right)^T (R_{cam}^W u_{axis}^{cam}) - 1 \le 0$$

where $p_{tar}$ is position of the gaze target, $p_{cam}$ is position of the camera, $R_{cam}^W$ is the orientation of the camera in world frame and $u_{axis}^{cam}$ is a desired gaze axis in camera frame.

20. Control Module

In many embodiments, the control module runs nominally at 100 Hz while processing 1 kHz data, as tested on the SURROGATE platform. The control module is responsible for executing the current action in the behavior system's state machine. In the case of manipulation tasks, actions may consist of planned motions, or task frame objectives, or both simultaneously. Planned motions are specified as a time series of waypoints in joint space. Task frame objectives are specified in terms of the activation status and input parameters of a variety of Generalized Compliant Motion (GCM) controllers, which include a Cartesian trajectory generator, closed-loop force and torque control, active compliance (spring/damper) emulation, and dithering. For mobility-based tasks (i.e. driving), an action is specified by a desired path in 2D space and a final desired heading. The control module implements a simple but effective path-following controller consisting of a look-ahead (i.e. carrot) generator and two virtually decoupled proportional controllers—one each for the translation and rotation velocities:

$$u_t = K_t e_t \cos(e_\theta), u_\theta = K_\theta e_\theta \tag{2}$$

where $u_t$ and $u_\theta$ denote the translational and rotational velocities, respectively, and $e_t$ and $e_\theta$ denote the distance from the carrot position and the heading error, respectively. The heading error is calculated as the difference between the current heading and the heading along the line connecting the current position to the carrot.

21. User Interfaces

A large part of the supervised remote operation of our framework relies on an intuitive user interface to the robot. This interface can be defined to be the "Operator Control Unit" (OCU), an interface which allows the human operator to interact with the robot at various levels of control. In various embodiments, it can be desired to find a balance between complete teleoperation control of the robot and complete autonomy of the robot. To this end, two types of operator interfaces have been developed that allow human level interaction with the robotic platform: an "Engineering-OCU" and a "Tablet-OCU". The Engineering-OCU is designed to be run on a computer desktop and exposes internal robot state information that additionally allows for direct control of the robot. The Tablet-OCU is designed for field operation use on a handheld device, requiring only high level directives from the user and relying more heavily on robot autonomy to execute actions and behaviors.

22. Engineering OCUs

Figure 15A:
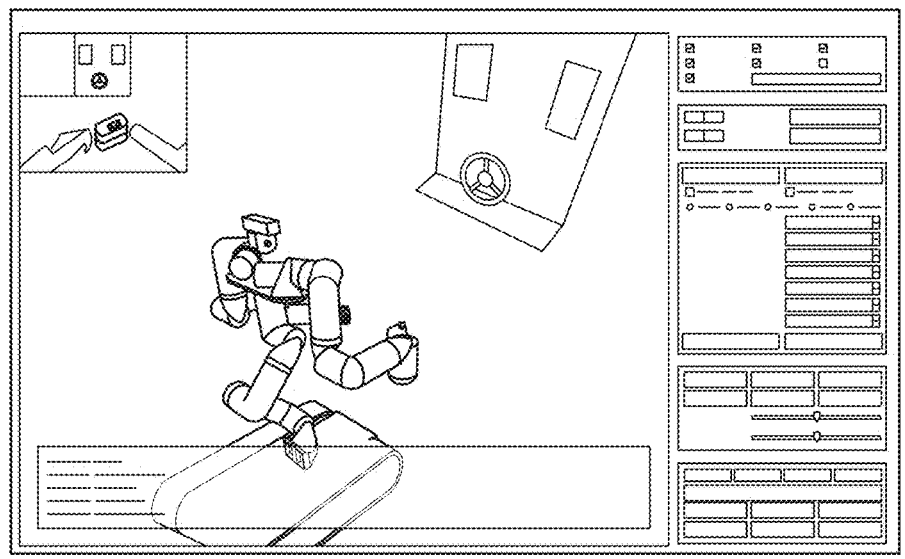
FIG. 15A illustrates an Engineering Operator Control Unit.

The Engineering OCU is written in C/C++ using OpenGL to define a 3D rendered world that can be navigated using a standard keyboard and mouse. Several widgets are used to frame the rendered world using the QT library that allow the user to insert objects, request maps from the perception module, specify behaviors to execute, and request planned actions to complete a particular behavior sequence. FIG. 15A illustrates the a screenshot of the Engineering OCU, showing the 31) OpenGL rendered world with a live 2D image feed from the robot left stereo camera (top-left) and a number of QT widgets on the right column. The 3D world occupies a majority of the display, and a number of widgets with buttons and sliders are on the right side. Through the use of behaviors, entire sequences of actions can be specified easily through the OCU by chaining multiple behaviors together in sequence. A majority of the behavior chaining is done for the user via button presses and sliders in various widgets available through the main GUI display, greatly reducing unnecessary operator interaction time. One fairly useful tool developed in the interface is the ability to fly a free-floating hand into the environment. This "virtual-hand" (as seen in FIG. 14C) allows the operator specify a desired behavior on an object in the environment potentially outside the reachable workspace of the robot and plan an entire sequence of mobility moves followed by manipulation behavior sequences all in one request.

23. Tablet OCUs

Figure 15B:
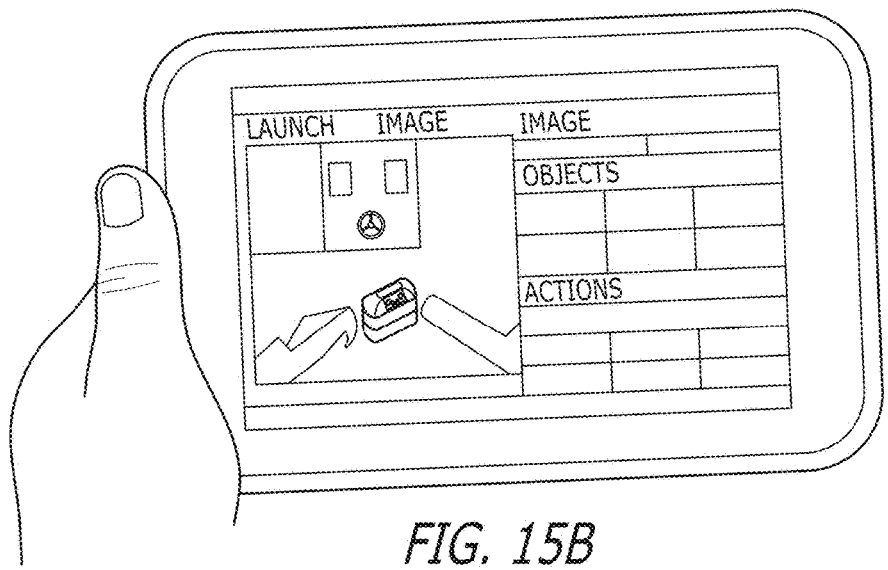
FIG. 15B illustrates an Tablet Operator Control Unit.

The Tablet OCU is written in C/C++ using the QT library for defining a number of widgets that simplify behavior specification. The interface itself is divided into various tabs allowing the user to observe process health, live robot image feeds, and 31) plan previews of robot behaviors prior to execution. The interface has been ported and tested on a Panasonic ToughPad FZ-G1 using the touch interface to identify objects, specify behaviors, and preview and execute robot actions. FIG. 15B illustrates one tab of the tablet interface as used by an operator to control the robotics platform developed for field operation use.

24. Implementations of the SURROGATE Robotics Platform

The SURROGATE robot designed and built at JPL is a mobile manipulation platform. Three 7-DOF limbs following the limb design used on the JPL RoboSimian platform were used to make up the two arms and torso of SURROGATE. The left and right limbs are connected via a chest-plate that sits on the end-effector of the torso. The base of the torso is mounted to a Qinetiq Talon tracked-wheel base. This particular design for manipulation and mobility increases the manipulation workspace of the robot, giving it a particular advantage in reach and manipulability in comparison to other robots such as the DARPA Atlas or the PR2 by Willow Garage.

In various embodiments, each right and left limb have interchangeable end-effectors: a Robotiq, Inc. three-fingered gripper or a rubber stub. In many embodiments, other end-effectors may be used. The gripper allows for grasping and actuation of man-made objects (single-handed or dual handed manipulation tasks) whereas the stub allows for bracing and support of the robot when traversing over difficult terrain or reaching further than the allowable balance polygon. All limbs, torso, and tracks are driven by Elmo motor controllers communicating over EtherCAT and RS-485 networks. An embedded computer system is installed on the base of the Qinetiq Talon base to control all actuation of the robot. The "control" computer runs a real-time Linux kernel with an Intel Core i7 processor.

In several embodiments, the perception head of the robotic platform is a stand-alone perception system developed by JPL. It consists of two Imperx BobCat-B2520 color cameras (2448×2050 resolution) connected via Camera-Link cables and arranged as a stereo pair. The stereo-camera pair is connected to a pan-tilt motor-actuated base to allow for user specified "look-at" behaviors for improved situational awareness. Mounted on top of the tilt motor is a Velodyne, Inc. HDL-32E laser scanner spinning at a rate of 10 revolutions per second with up to 700,000 range points per second covering a 1-100 m range. This sensor provides long-range obstacle detection and map building as discussed above. Lastly, an IMU exists on the tilt plate providing angular rate and accelerations of the perception head. The cameras, laser-scanner, and IMU data stream are all synchronized into a common time frame via a micro-controller unit (MCU). The MCU sends a trigger signal to synchronize the camera capture between both color cameras at 10 Hz. The trigger signal is based off a pulse-per-second (PPS) signal that comes from the Velodyne laser scanner. This signal allows for the synchronization of all laser packets into the MCU timeframe as well. The 200 Hz IMU data stream is also synchronized off the same MCU trigger signal to send 20 packets of gyro and acceleration data for every sync pulse. This allows camera data, laser data, and IMU data to be represented all in the MCU timeframe, allowing for synchronous data signals. Finally, an embedded small form-factor computer is mounted to the underside of the tilt plate, running an Intel Core i7 processor. This "perception" computer runs a standard 64-bit Ubuntu-Linux 12.04 install and is responsible for running the processes for stereo vision, visual odometry, LiDAR odometry, short-range manipulation mapping, and long-range obstacle mapping—running nominally at 7.5 Hz. Both the "control" computer and "perception" computer communicate over a dedicated gigabit network.

25. Navigation Simulations

The mobility simulations consisted of five separate runs with the robot placed at a known start location, manually driven approximately 5 m away, and commanded to autonomously navigate back to the origin while using only the LiDAR pose solution described above.

Figure 16:
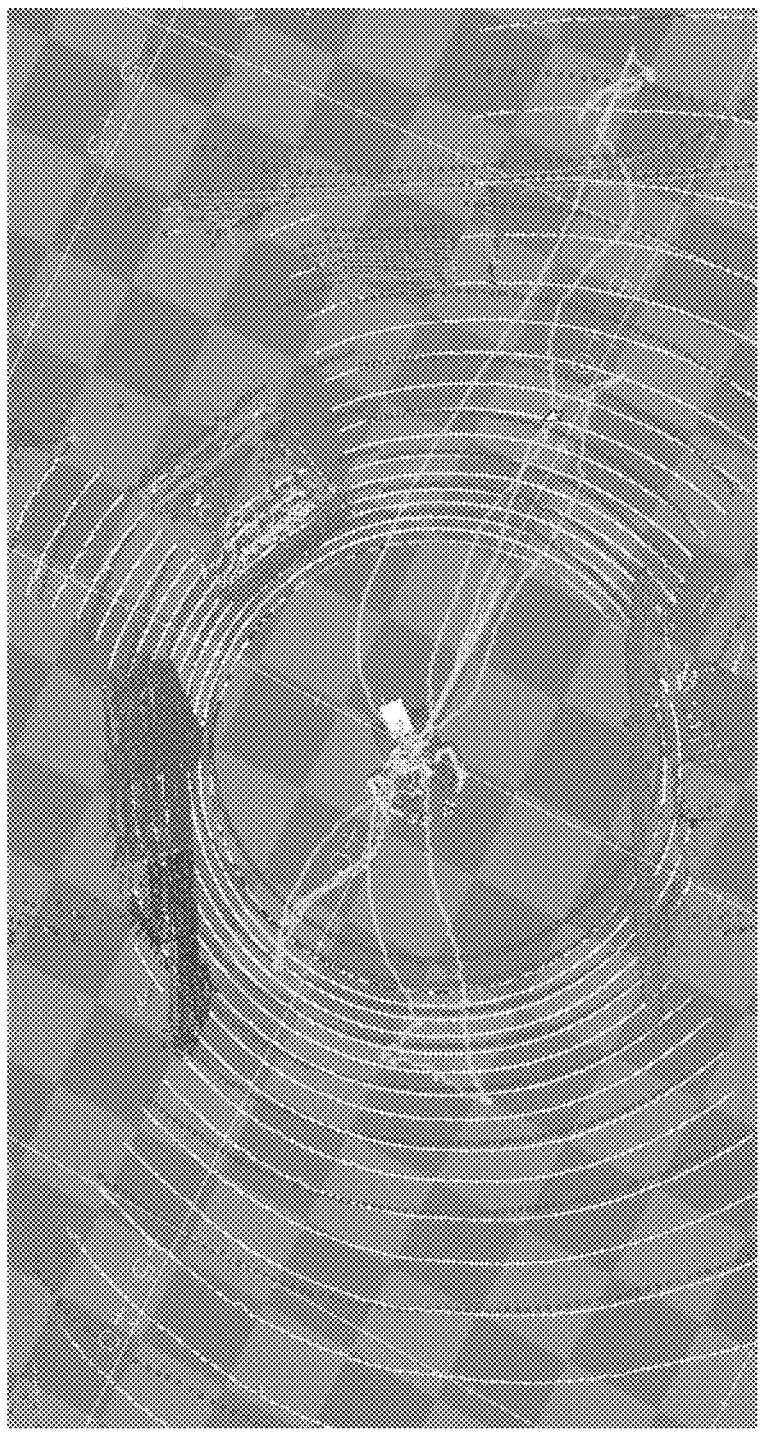
FIG. 16 illustrates mobility simulations for the SURROGATE robotics platform.

FIG. 16 provides a screenshot of the navigation simulated path taken from one of five separate runs on mobility overlaid with LiDAR point clouds used for pose estimation. The results of the five runs resulted in displacements of [12 cm 10 cm 8 cm 9 cm 13 cm] from the origin when the robot was commanded to return to the origin, with an average displacement of 10 cm. Note that the threshold for the mobility planner on reaching the goal was 5 cm and the grid size used in the map for planning was 5 cm as well; so in actuality the pose accuracy was likely much better than 10 cm. The paths taken were approximately each 5 m long. While these navigation tests were rather simple exercises, these results capture system level navigation capabilities since several modules were run to produce these results, including track control, D-star navigation, perception, mobility, manipulation, and pose estimation.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A robotics platform comprising:
   a processor;
   a memory containing a whole body motion application;
   a spine, where the spine has seven degrees of freedom and comprises a spine actuator and three spine elbow joints that each include a first spine joint actuator and a second spine joint actuator, where the axis of rotation of the first spine joint actuator is perpendicular to the axis of rotation of the second spine joint actuator;
   a first limb, where the first limb comprises a first limb actuator, three first limb elbow joints that each include two first limb joint actuators, and a first end-effector;
   a second limb, where the second limb comprises a second limb actuator, three second limb elbow joints that each include two second limb actuators, and a second end-effector;
   a tracked base;
   a connecting structure that connects the first limb and the second limb to the spine;
   a second connecting structure that connects the spine to the tracked base;
   wherein the processor is configured by the whole body motion application to move the first limb, the second limb, and the spine to perform whole body motion by evaluating a kinematic chain for the robotics platform using the following expression:

$$\min \|\dot{\theta}\|_{2, P_\theta} + \|V_{WE}^B - \tilde{V}_{WE}^B\|_{2, P_E} + \|V_{WC}^B - \tilde{V}_{WC}^B\|_{2, P_C}$$

where $\dot{\theta}$ are joint angle velocities of the three first limb elbow joints, the three second limb elbow joints, and the three spine elbow joints, $V_{WE}^B$ is a base body velocity of the end-effector frame (E) in a world frame W, $V_{WC}^B$ is a center of mass body velocity expressed in a base frame, $P_E$ is a weighting matrix of the end-effector, and $P_\theta$ is a weighing matrix of a regularizer.

2. The robotics platform of claim 1, further comprising a head, where the head comprises at least one sensor; and a third connecting structure connecting the head to the spine.

3. The robotics platform of claim 2, wherein the at least one sensor is a light detection and ranging (LiDAR) system.

4. The robotics platform of claim 2, wherein the at least one sensor is a pair of stereo cameras.

5. The robotics platform of claim 1, wherein the three spine elbow joints have the same dimensions and construction.

6. The robotics platform of claim 1, wherein the three first limb elbow joints and the three second limb elbow joints have the same dimensions and construction.

7. The robotics platform of claim 1, wherein the three spine elbow joints, the three first limb elbow joints, and the three second limb elbow joints have the same dimensions and construction.

8. The robotics platform of claim 1, wherein the first end-effector is a hand assembly including a plurality of articulated fingers.

9. The robotics platform of claim 1, wherein the kinematic chain is subject to joint velocity, torque, and center of support constraints.

10. The robotics platform of claim 1, wherein performing whole body motion further comprises end-effector solving and path solving.

11. The robotics platform of claim 1, wherein the second end-effector is a hand assembly including a plurality of articulated fingers.

* * * * *